US012286352B2

United States Patent
Tse et al.

(10) Patent No.: US 12,286,352 B2
(45) Date of Patent: Apr. 29, 2025

(54) FLAME-SYNTHESIS OF MONOLAYER AND NANO-DEFECTIVE GRAPHENE

(71) Applicant: Rutgers, The State University of New Jersey, New Brunswick, NJ (US)

(72) Inventors: Stephen D. Tse, Warren, NJ (US); Hua Hong, Weehawken, NJ (US); Bernard H. Kear, Whitehouse Station, NJ (US)

(73) Assignee: Rutgers, the State University of New Jersey, New Brunswick, NJ (US)

( * ) Notice: Subject to any disclaimer, the term of this patent is extended or adjusted under 35 U.S.C. 154(b) by 0 days.

(21) Appl. No.: 17/554,293

(22) Filed: Dec. 17, 2021

(65) Prior Publication Data
US 2022/0250913 A1    Aug. 11, 2022

Related U.S. Application Data

(63) Continuation of application No. 16/229,055, filed on Dec. 21, 2018, now Pat. No. 11,235,977.

(60) Provisional application No. 62/608,739, filed on Dec. 21, 2017.

(51) Int. Cl.
*C01B 32/184*    (2017.01)
*B82Y 40/00*    (2011.01)

(52) U.S. Cl.
CPC ............. *C01B 32/184* (2017.08); *B82Y 40/00* (2013.01); *C01P 2002/52* (2013.01); *C01P 2002/82* (2013.01)

(58) Field of Classification Search
CPC ... C01B 32/184; B82Y 40/00; C01P 2002/52; C01P 2002/82
See application file for complete search history.

(56) References Cited

U.S. PATENT DOCUMENTS

| | | |
|---|---|---|
| 5,000,779 A | 3/1991 | German et al. |
| 5,498,278 A | 3/1996 | Edlund |
| 5,604,037 A | 2/1997 | Ting et al. |
| 5,876,683 A | 3/1999 | Glumac et al. |
| 6,882,094 B2 | 4/2005 | Dimitrijevic et al. |
| 6,979,433 B1 | 12/2005 | Saito et al. |
| 7,157,069 B2 | 1/2007 | Jurng et al. |
| 7,279,222 B2 | 10/2007 | Hearley et al. |
| 7,323,034 B2 | 1/2008 | Buxbaum |
| 7,335,344 B2 | 2/2008 | Height et al. |
| 7,371,065 B2 | 5/2008 | Aigner et al. |
| 7,396,520 B2 | 7/2008 | Howard et al. |
| 8,845,768 B2 | 9/2014 | Wachsman et al. |
| 9,388,042 B2 | 7/2016 | Tse et al. |
| 10,099,928 B2 | 10/2018 | Tse et al. |
| 2004/0050207 A1 | 3/2004 | Wooldridge et al. |
| 2011/0084237 A1 | 4/2011 | Wachsman et al. |

(Continued)

FOREIGN PATENT DOCUMENTS

WO    2009/020958 A2    2/2009

OTHER PUBLICATIONS

Park, et al., Porous graphene-based membranes for water purification from metal ions at low differential pressures, Nanoscale 2016; 8: 9563-9571 (Year: 2016).*

(Continued)

*Primary Examiner* — Daniel C. McCracken
(74) *Attorney, Agent, or Firm* — Robert C. Netter, Jr.; Dann, Dorfman, Herrell & Skillman

(57) ABSTRACT

Methods for the production of carbon-based and other nanostructures are provided.

31 Claims, 17 Drawing Sheets

(56) References Cited

U.S. PATENT DOCUMENTS

Figure 1A:
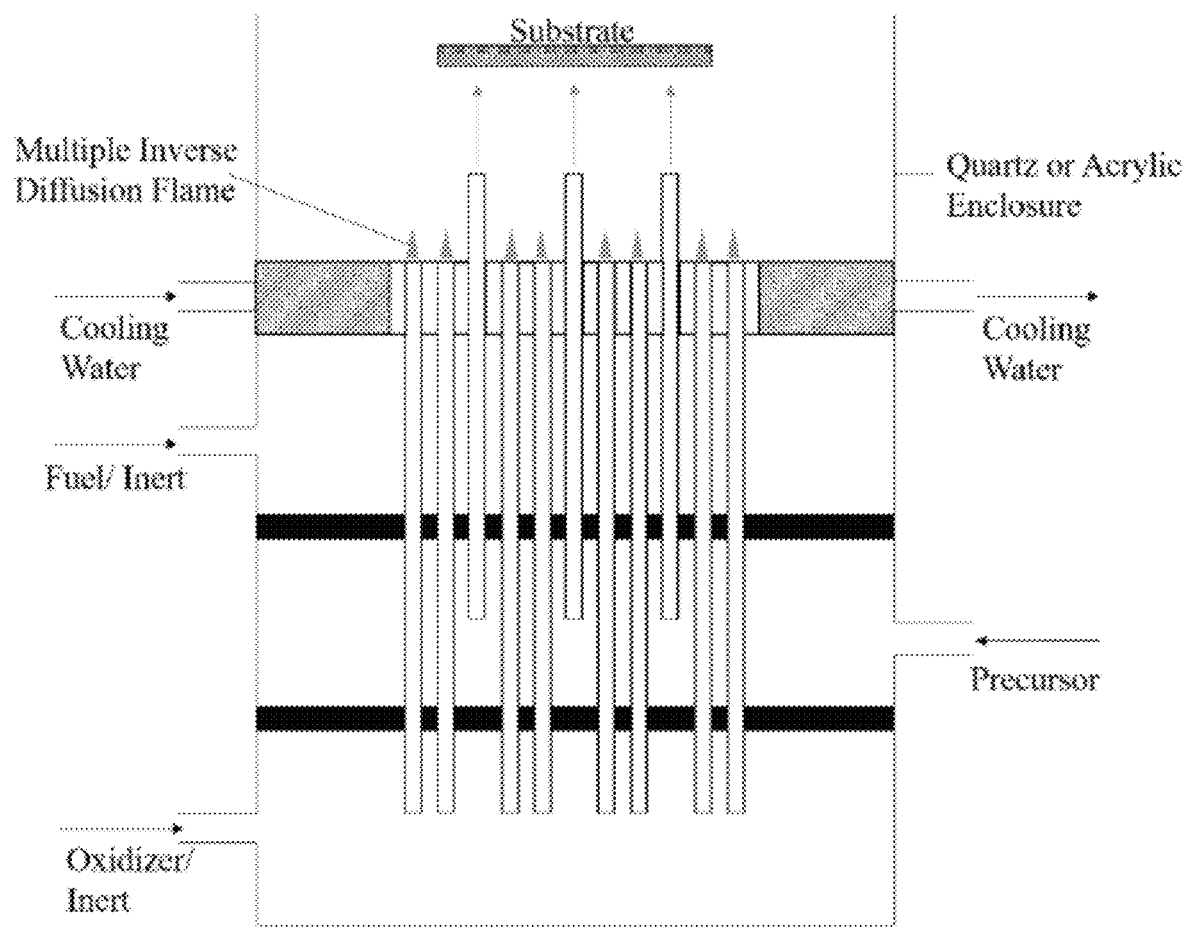

| | | | |
|---|---|---|---|
| 2011/0108521 A1 | 5/2011 | Woo et al. | |
| 2013/0156678 A1 | 6/2013 | Banerjee et al. | |
| 2013/0302693 A1* | 11/2013 | Sun | H01M 4/583 252/502 |
| 2014/0054505 A1* | 2/2014 | Tse | F23D 14/84 423/291 |
| 2014/0230653 A1* | 8/2014 | Yu | B01D 71/024 427/244 |
| 2017/0125320 A1 | 5/2017 | Sung et al. | |

OTHER PUBLICATIONS

Memon, et al., Flame synthesis of graphene films in open environments, Carbon 2011; 49: 5064-5070 (Year: 2011).*

Ossler, F., et al., "Sheet-Like Carbon Particles with Graphene Structures Obtained from a Bunsen Flame," Carbon (2010) 48:4203-4206.

Xu, et al. "Synthesis of carbon nanotubes on metal alloy substrates with voltage bias in methane inverse diffusion flames" Carbon (2006) 44:570-577.

Rao, et al. "Fullerenes, nanotubes, onions and related carbon structures" Materials Science and Engineering (1995) R15:209-262.

Hu, et al. "Experimental and numerical investigation of non-premixed tubular flames" Proceedings of Combustion Institute (2007) 31:1093-1099.

Merchan-Merchan, et al. "Combustion synthesis of carbon nanotubes and related nanostructures" Process in Energy and Combustion (2010) 36:696-727.

Memon, et al. "Scalable Flame Synthesis of Carbon Nanotubes on Substrates" 2010 Materials Research Society Fall Meeting & Exhibit. Nov. 29, 2010; Abstract C4.10. Accessed online Aug. 8, 2013 <http://www.mrs.org/f10-abstract-c/>.

Murayama, et al., "Uniform Deposition of Diamond Films using a Flat Flame Stabilized in the Stagnation-point Flow" J. Appl. Phy. (1991) 69(11):7924-7926.

Zhou, et al., "Synthesis of Carbon Nanotubes by Sequential Pyrolysis and Combustion of Polyethylene" (2010) Carbon 48:4024-4034.

Xu, F., "Investigating Flame-Based Synthesis of Carbon Nanotubes and Metal-Oxide Nanowires" (2007) Ph.D. Dissertation, Rutgers, The State University of New Jersey.

Rao, et al., "Fullerenes, Nanotubes, Onions and Related Carbon Structures" Mater. Sci. Engr. (1995) R15:209-262.

Liu, et al., "Rapid flame synthesis of multilayer graphene on SiO2/Si substrate" J Mater Sci: Mater Electron (2016) 27:2795-2799.

Yao, et al., "Monolayer graphene growth using additional etching process in atmospheric pressure chemical vapor deposition" Carbon (2012) 50:5203-5209.

Park, et al., "Porous graphene-based membranes for water purification from metal ions at low differential pressures" Nanoscale (2016) 8:9563-9571.

Huang, et al., "Graphene-Based Membranes for Molecular Separation" J. Phys. Chem. Lett. (2015) 6:2806-2815.

Perreault, et al., "Environmental applications of graphene-based nanomaterials" Chem. Soc. Rev. (2015) 44:5861-5896.

Liu, et al., "Graphene-based membranes" Chem. Soc. Rev. (2015) 44:5016-5030.

* cited by examiner

Figure 4A
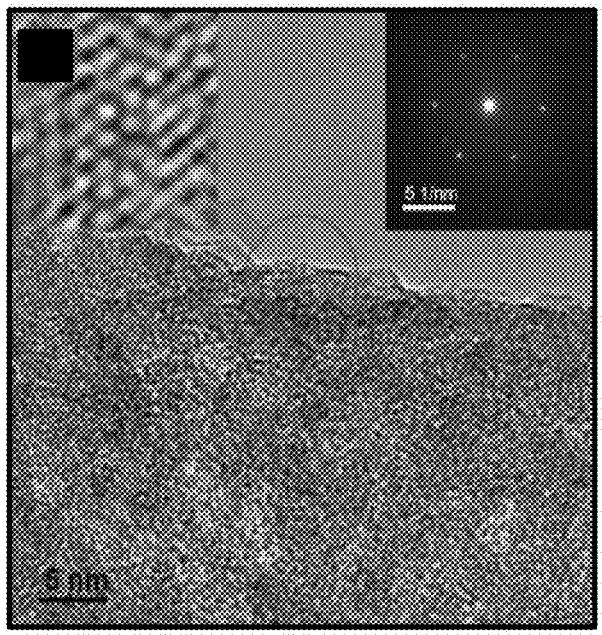
Figure 4B
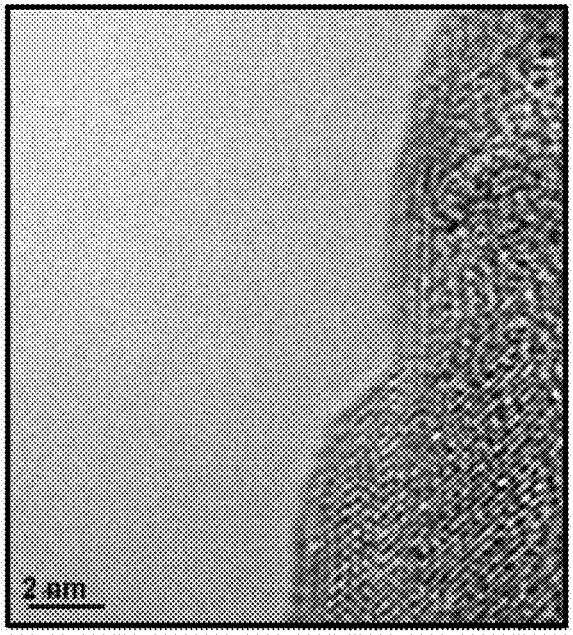
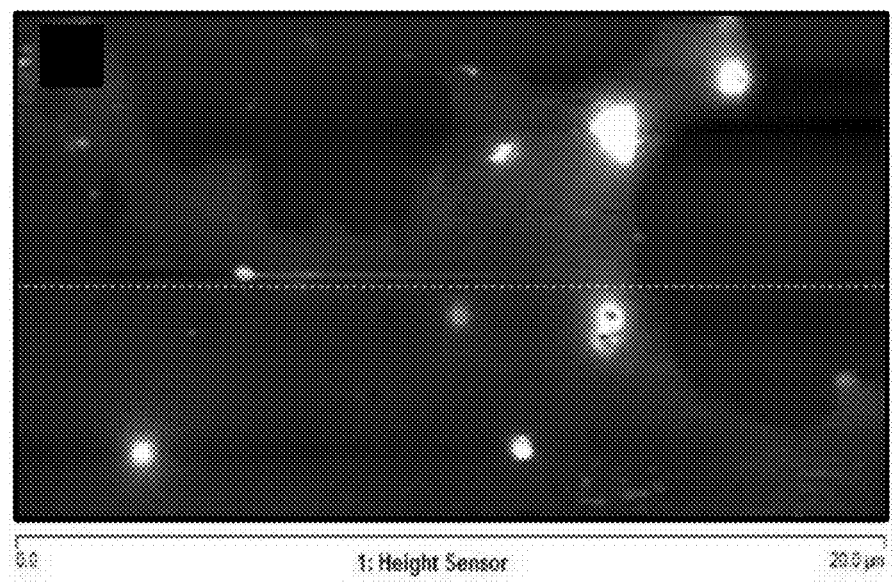
Figure 4C

FLAME-SYNTHESIS OF MONOLAYER AND NANO-DEFECTIVE GRAPHENE

This application is a continuation application of U.S. patent application Ser. No. 16/229,055, filed on Dec. 21, 2018, which claims priority under 35 U.S.C. § 119(e) to U.S. Provisional Patent Application No. 62/608,739, filed on Dec. 21, 2017. The foregoing applications are incorporated by reference herein.

This invention was made with government support under Grant No. W911NF-17-1-0111 awarded by the Army Research Office and under Grant No. CBET-1249259 awarded by the National Science Foundation. The government has certain rights in the invention.

FIELD OF THE INVENTION

This invention describes methods for the synthesis of carbon-based nanostructures and articles derived therefrom.

BACKGROUND OF THE INVENTION

Flame synthesis has been used for manufacturing fine powders since the 1940s, when fumed silica was first mass-produced and marketed (Pratsinis, S. E. (1998) Progress Ener. Combustion Sci., 24(3):197-219). Today, flame synthesis is widely used in commercial production of nanoparticles such as carbon blacks, pigmentary titania, zinc oxides, fumed silica, and optical fibers (Teoh, W. Y. (2013) Materials 6(8):3194-3212). A typical process of synthesizing ceramic powders is by hydrolysis of chloride-based precursor vapor injected into a flame. Flame processes readily provide the high temperatures needed for gas-phase synthesis. The key reasons flame synthesis is favored by large-scale manufactures are its scalability and relatively low cost.

Flame synthesis is currently used in producing various advanced nanomaterials, e.g., carbon nanotubes (CNTs) and nanoparticles with complex compositions (Li, et al. (2016) Progress Ener. Combustion Sci., 55:1-59). However, most studies still focus on the flame aerosol approach. Although chemical vapor deposition (CVD)-type flame synthesis of nanostructured carbon and metal oxides has been demonstrated in recent years, its ability for large production needs more development. Nevertheless, flame synthesis has the potential of extending its use into CVD-type processes for the controllable growth of large-area nanomaterials on substrates and surfaces with advantages in scalability and cost.

SUMMARY OF THE INVENTION

In accordance with the instant invention, methods for synthesizing carbon-based, particularly graphene, materials or structures. In a particular embodiment, the method comprises reacting an oxidizer (e.g., air or $O_2$) and a fuel (e.g., hydrogen and/or hydrogen precursors) in one or more non-premixed, multiple, inverse-diffusion flame burner(s). The non-premixed, multiple, inverse-diffusion flame burner may comprise an array of stabilized flames that form a uniform flat-flame front with respect to distances downstream. In a particular embodiment, the multiple, inverse-diffusion flame burner is modified wherein the burner comprises delivery tubes for the fuel/precursor extending beyond the main burner surface. In a particular embodiment, the pyrolysis species exiting the multiple, inverse-diffusion flame burner are directed onto substrates (e.g., metal substrates such as copper) to form coatings, preforms, flakes, films, sheets, plates, discs, and the like. In a particular embodiment, graphene structure is monolayer graphene or a nano-defective (e.g., at the atomic scale) graphene. The graphene structures may be doped (e.g., with B or N). In a particular embodiment, the graphene structures are synthesized by a method comprising a) reducing a metal substrate in the modified, multiple inverse-diffusion flame burner wherein hydrogen ($H_2$) is the only fuel; b) adding a hydrocarbon precursor through the fuel lines extending beyond the main burner surface of the modified, multiple inverse-diffusion flame burner to synthesize the graphene on the substrate; and, optionally, c) annealing the flame-synthesized graphene of step b) by running the modified, multiple inverse-diffusion flame burner wherein hydrogen ($H_2$) is the only fuel.

In a particular embodiment, methods of synthesizing monolayer graphene are provided comprising a) reducing a metal substrate in a modified, multiple inverse-diffusion flame burner wherein hydrogen ($H_2$) is the only fuel; b) adding a hydrocarbon precursor through the fuel lines extending beyond the main burner surface of the modified, multiple inverse-diffusion flame burner to synthesize the graphene on a substrate; and c) annealing the flame-synthesized graphene of step b) by running the modified, multiple inverse-diffusion flame burner wherein hydrogen ($H_2$) is the only fuel.

In a particular embodiment, methods of synthesizing nano-defective (e.g., at the atomic scale) graphene are provided comprising a) reducing a metal substrate in a modified, multiple inverse-diffusion flame burner wherein hydrogen ($H_2$) is the only fuel; b) adding a hydrocarbon precursor through the fuel lines extending beyond the main burner surface of the modified, multiple inverse-diffusion flame burner to synthesize the graphene on the substrate; and, optionally, c) annealing the flame-synthesized graphene of step b) by running the modified, multiple inverse-diffusion flame burner wherein hydrogen ($H_2$) is the only fuel, wherein the flame-synthesized graphene of step b) has an $I_D/I_G$ ratio of about 0.6 or higher prior to step c). In a particular embodiment, the metal substrate is about 99.9% pure.

BRIEF DESCRIPTIONS OF THE DRAWING

Figure 1B:
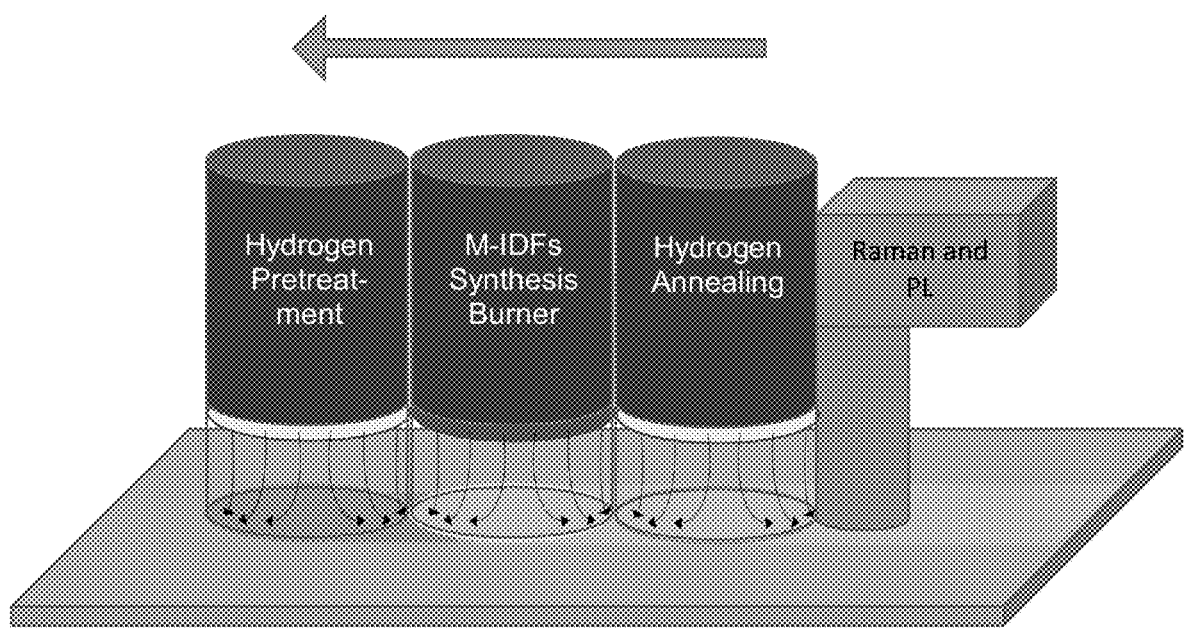

FIG. 1A provides a schematic diagram of a modified multi-element inverse-diffusion flames (m-IDFs) burner setup modified with uniform-distributed precursor tubes staged above (e.g., extending beyond) the main burner surface at a fixed height. FIG. 1B provides a rasterizing 3-burner assembly across a surface to coat/grow graphene. The first burner reduces the oxide layer; the second burner synthesizes graphene on the surface; and the third burner anneals the graphene to change its characteristics. A monitoring system of Raman and Photoluminescence may follow the burners to assess the coating quality as it is laid down/grown.

Figure 2:
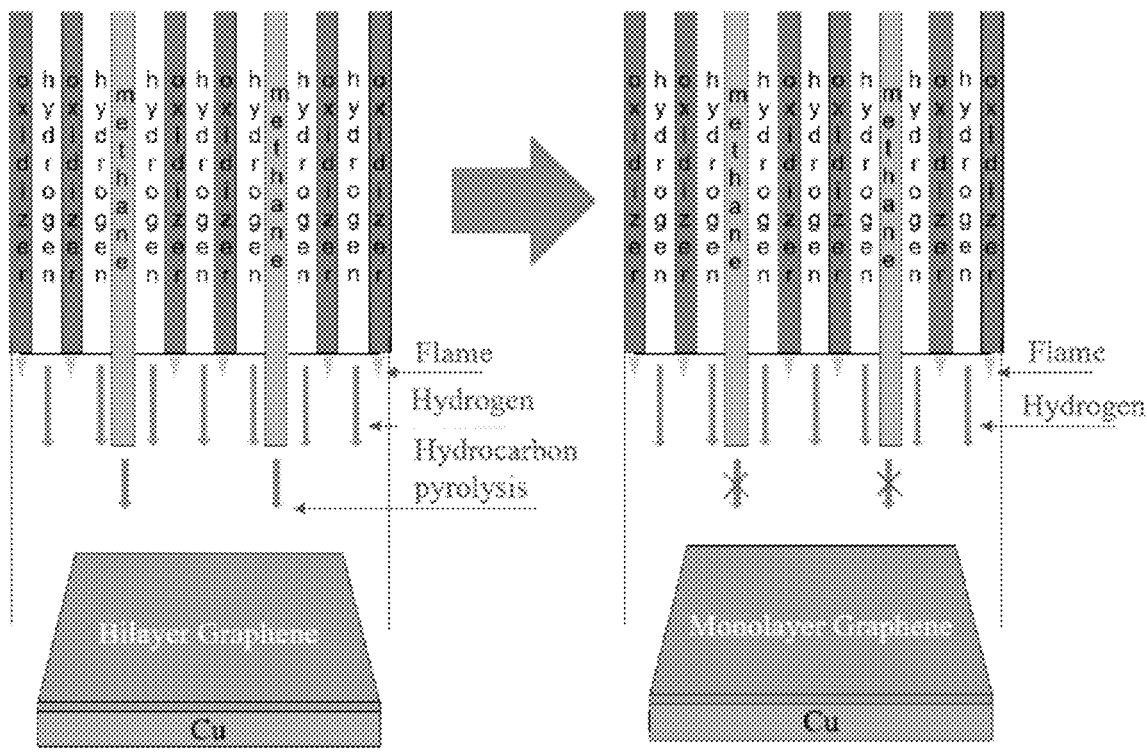

FIG. 2 provides a schematic of two-step flame synthesis of monolayer graphene using modified m-IDF setup.

Figure 3:
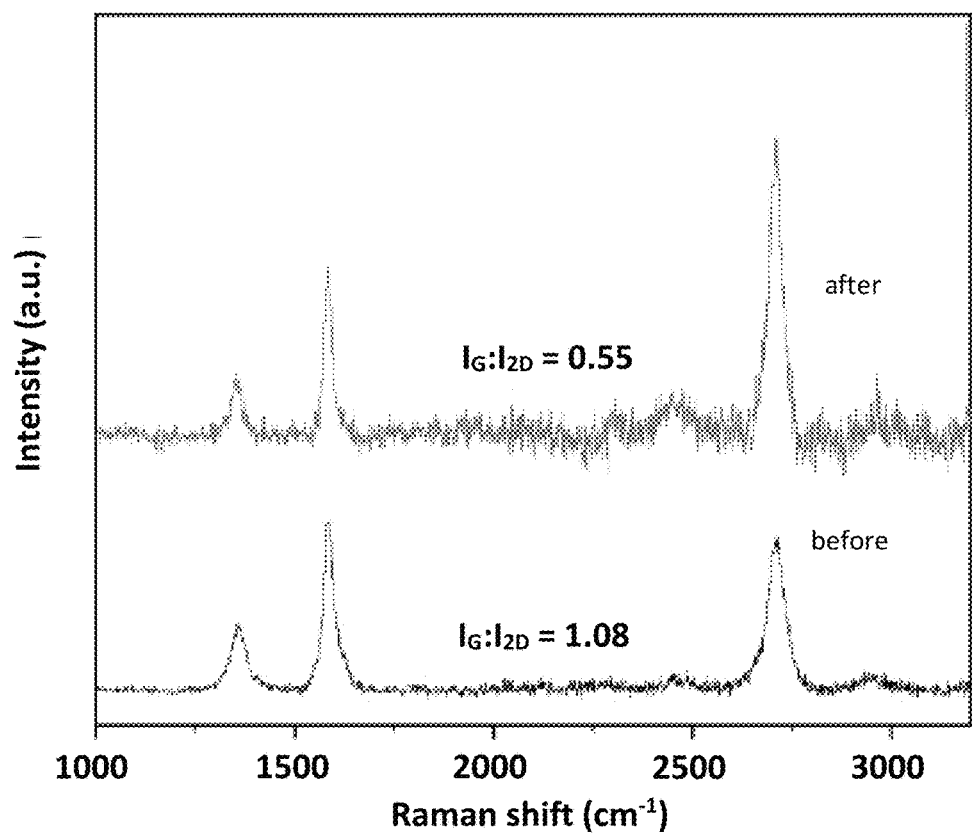
Figure 3:
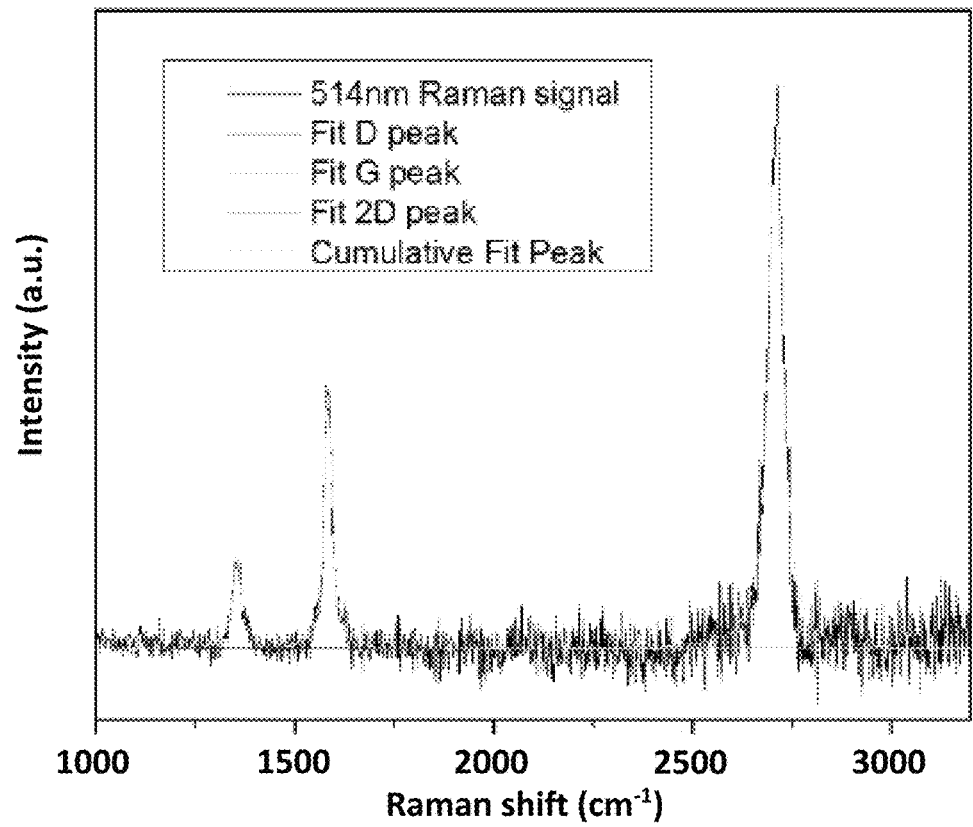

FIG. 3 provides typical Raman spectra of graphene sample before and after post-growth hydrogen annealing treatment (top). A single Lorentzian fitting of a Raman spectra from monolayer graphene sample is also provided (bottom). Substrate background signals are subtracted. The spectra are normalized with the G band.

FIGS. 4A and 4B provide TEM images of monolayer graphene with different resolutions. The top right inset of FIG. 4A shows the SAED pattern, and the top left inset of FIG. 4A shows a magnified image of the hexagonal atomic lattice in the circled edge. FIG. 4C provides an AFM image of monolayer graphene with highlighted spots of residuals from transfer process.

Figure 5:
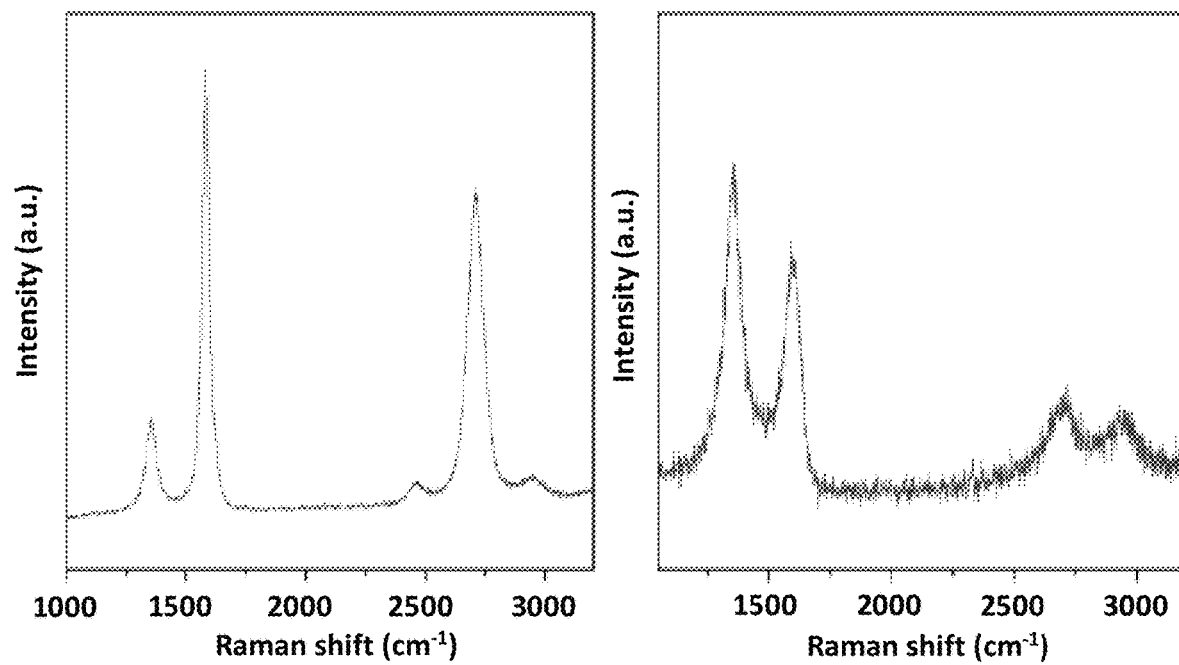

FIG. 5 provides a typical Raman spectra of few-layer graphene grown on nickel at 1000° C. (left) and a Raman spectra of few-layer graphene on Si/SiO$_2$ using pulsed laser deposition (PLD) at 900° C. in vacuum (right). Substrate background signals are subtracted. The spectra are normalized with the G band.

Figure 6:
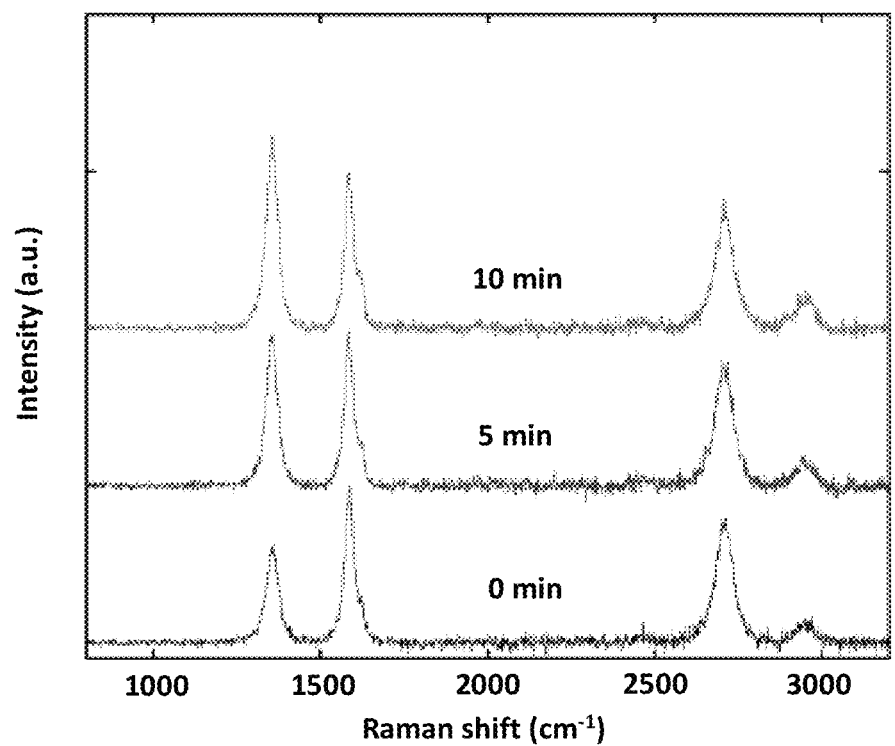

FIG. 6 provides a Raman spectra of defective graphene with different hydrogen annealing time. Substrate background signal is subtracted. The spectra are normalized with the G band.

Figures 7A, 7B, 7C:
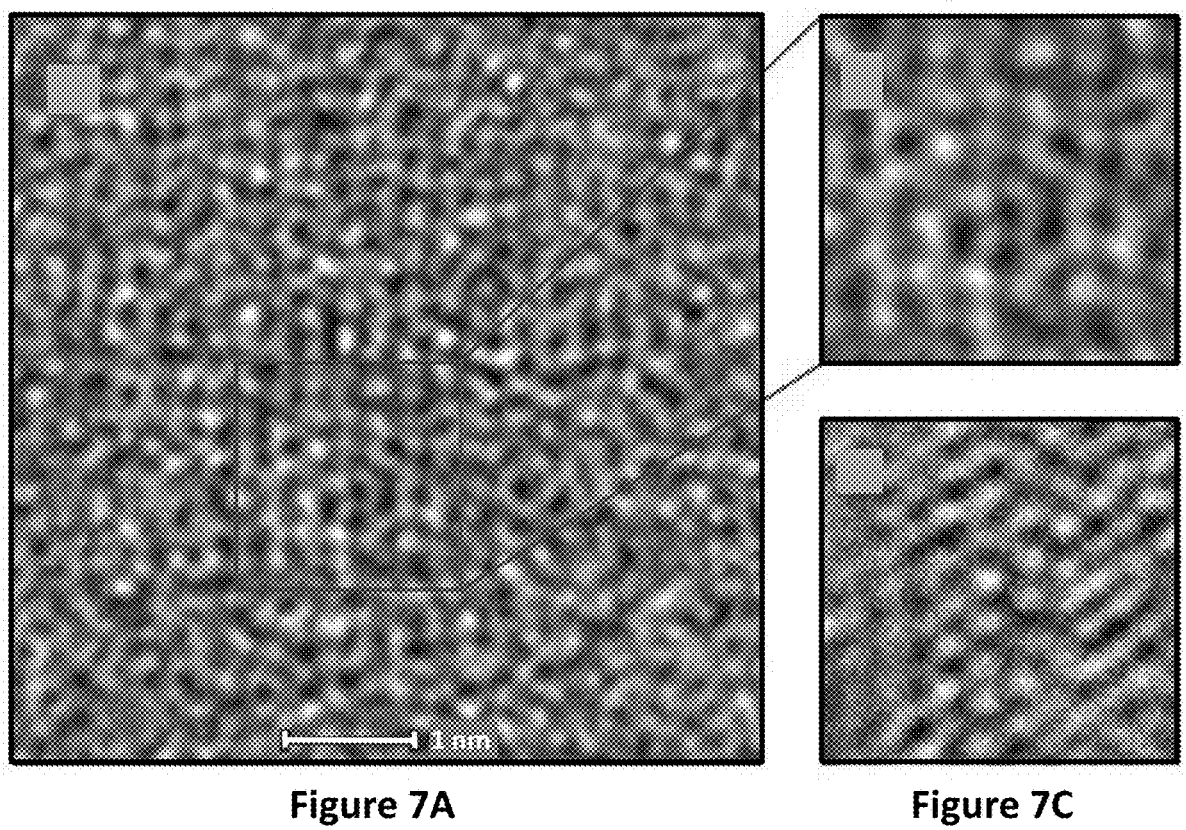

FIG. 7A provides a high-resolution TEM image of flame-synthesized highly-defective graphene captured by Room Temperature Scanning/Transmission Electron Microscope (FEI Talos F200X S/TEM, 200 kV). FIG. 7B provides an enlarged image of the selected area (red circled) of FIG. 7A. FIG. 7C provides an enlarged TEM image of FIG. 4A.

Figure 8:
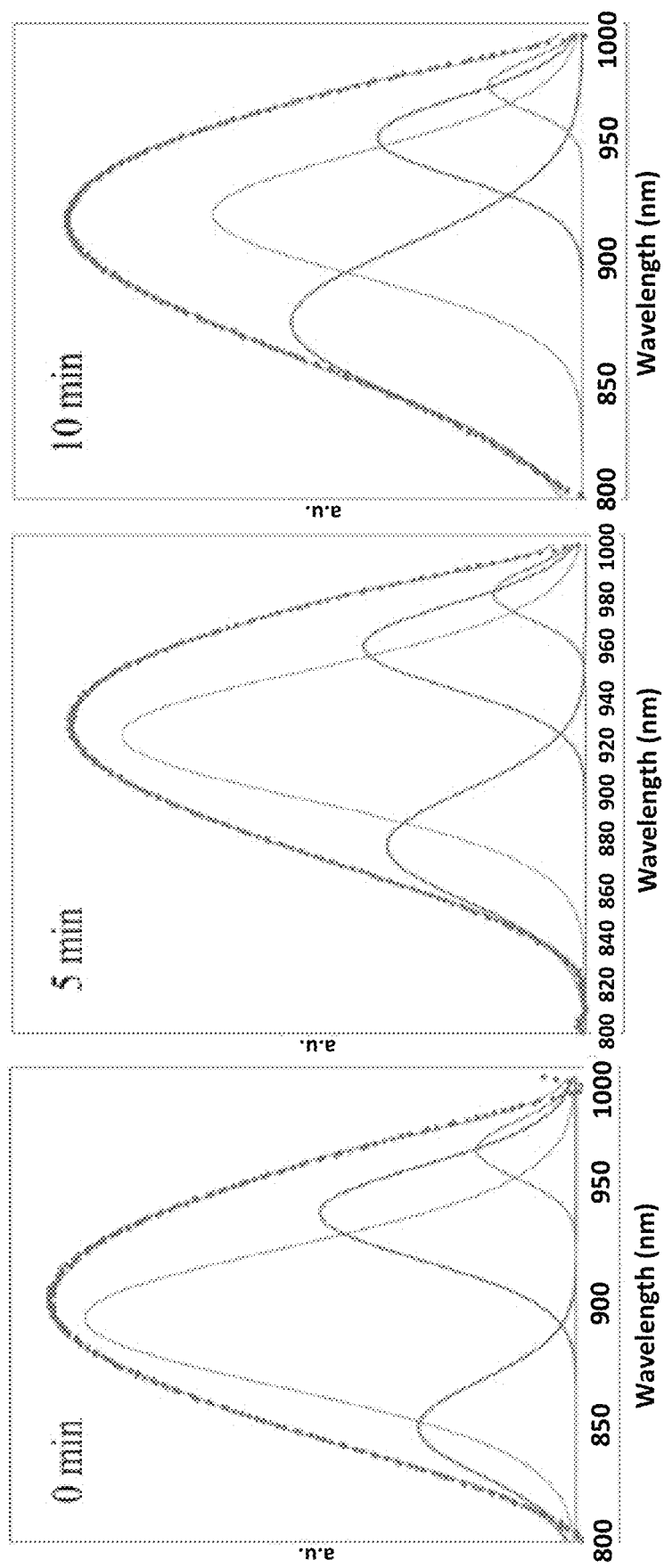

FIG. 8 shows band energies of flame-synthesized defective graphene with Cu substrate at different post-growth hydrogen annealing time. The background from Cu plasmonic resonance (580 nm) is subtracted for all the samples.

Figure 9:
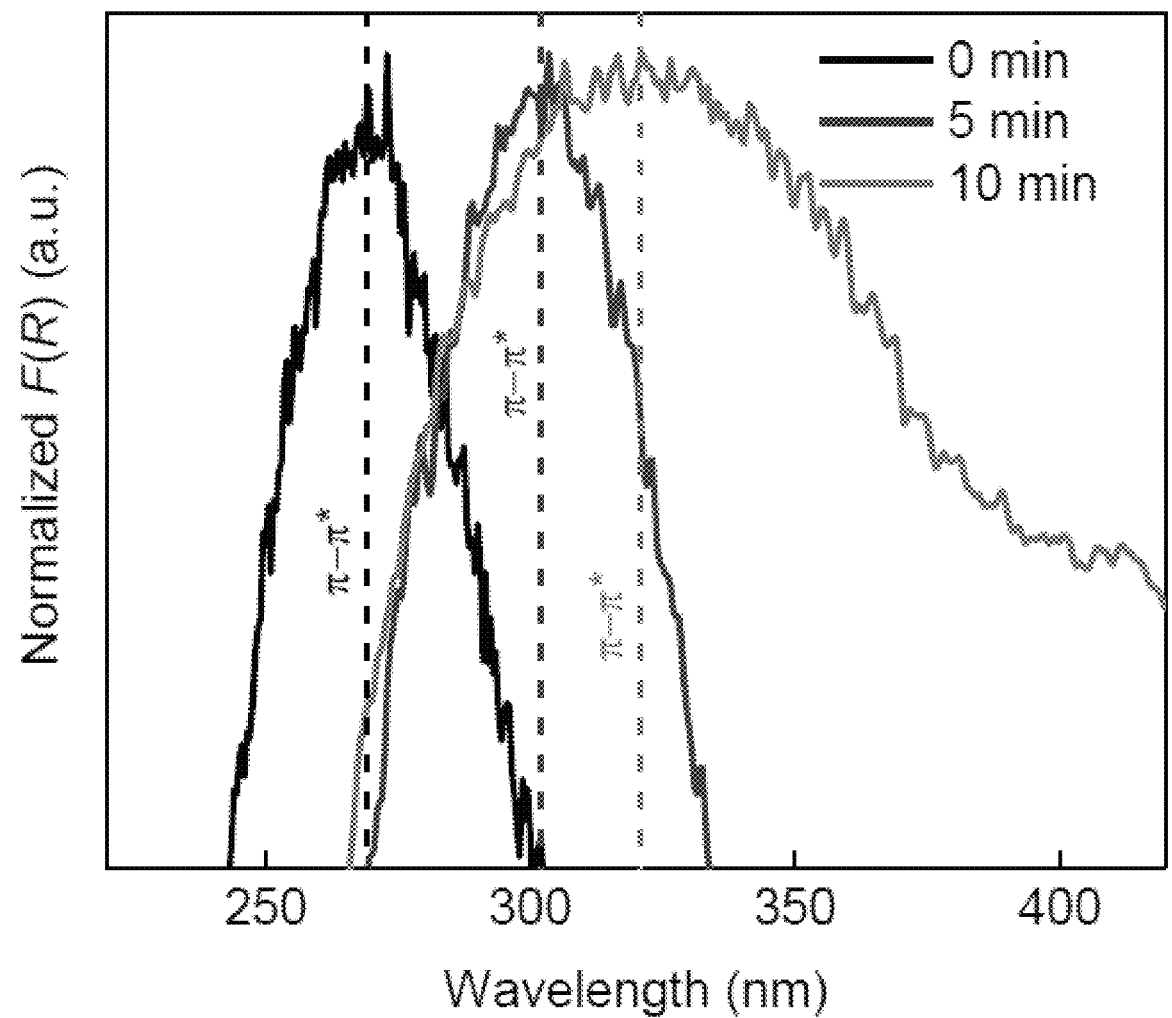

FIG. 9 provides a graph of normalized Kubelka Munk of graphene samples; increasing time and increasing defects leads to a red-shift in the π-π* transition of the aromatic C=C bond in graphene.

Figure 10:
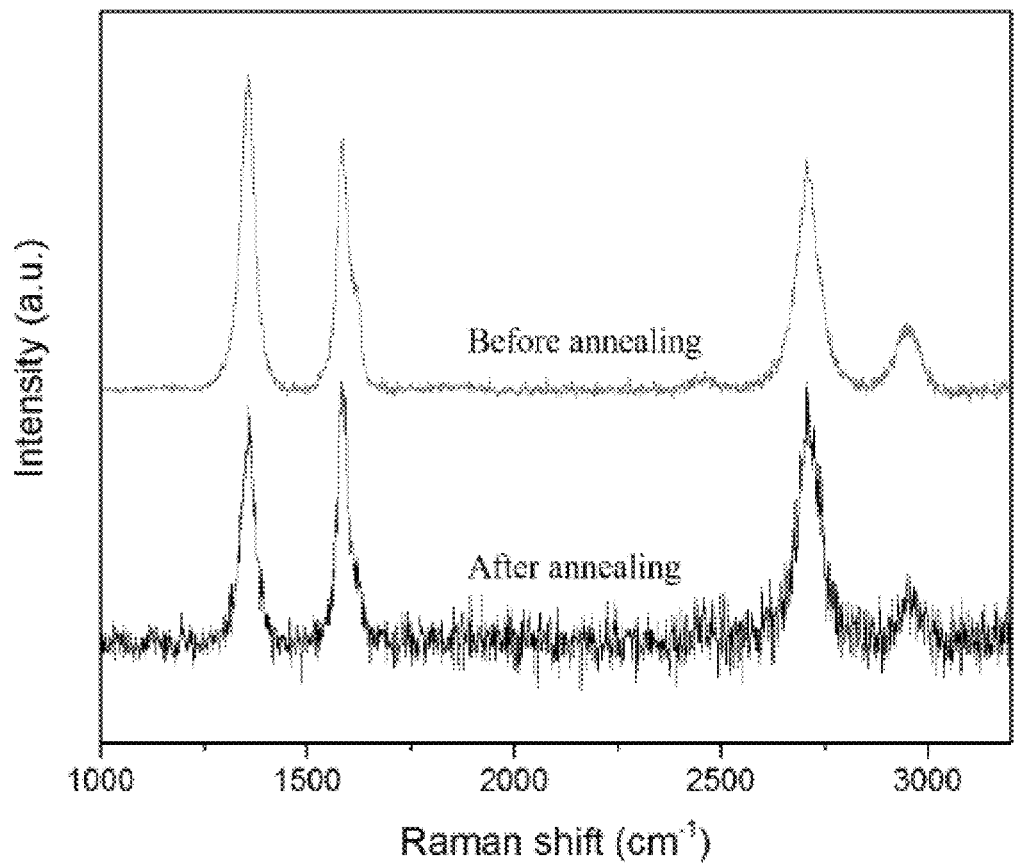

FIG. 10 provides Raman spectra of ultra-smooth Cu sample before and after hydrogen annealing. Substrate background signal is subtracted. The spectra are normalized with the G band.

Figure 11:
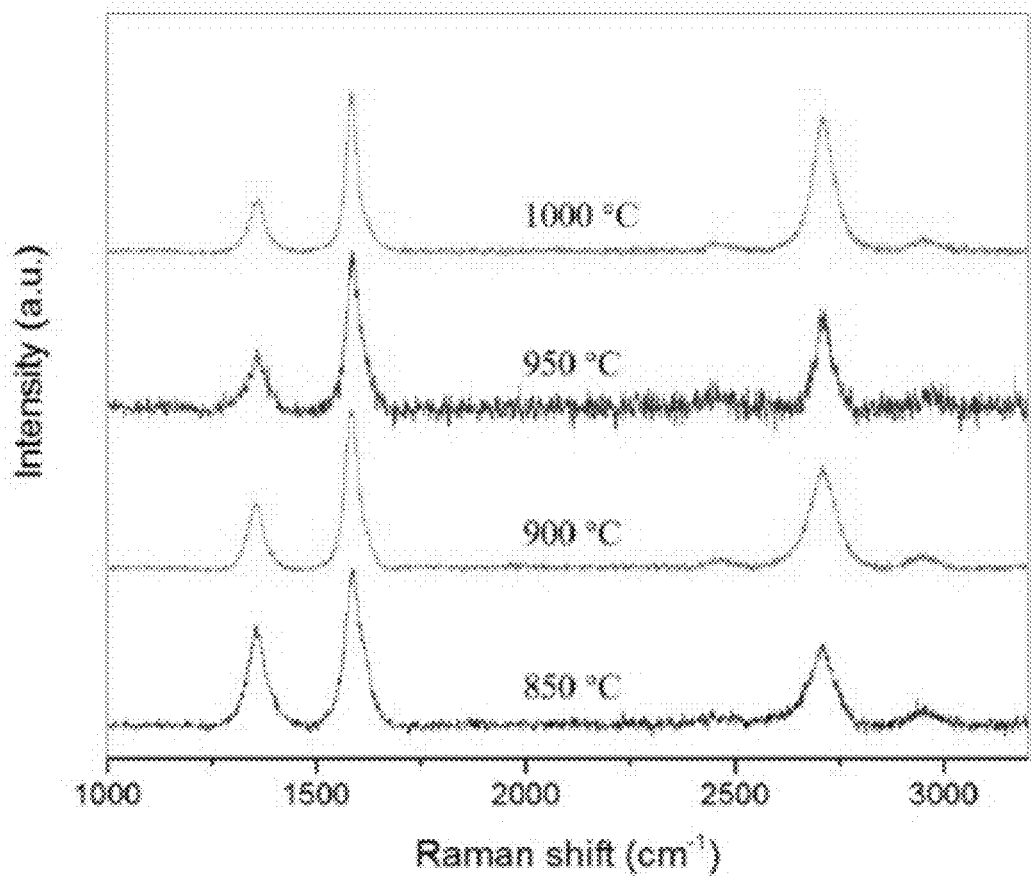

FIG. 11 provides Raman spectra of graphene grown on Cu at different temperatures. Substrate background signals are all subtracted. The spectra are normalized with the G band.

Figure 12:
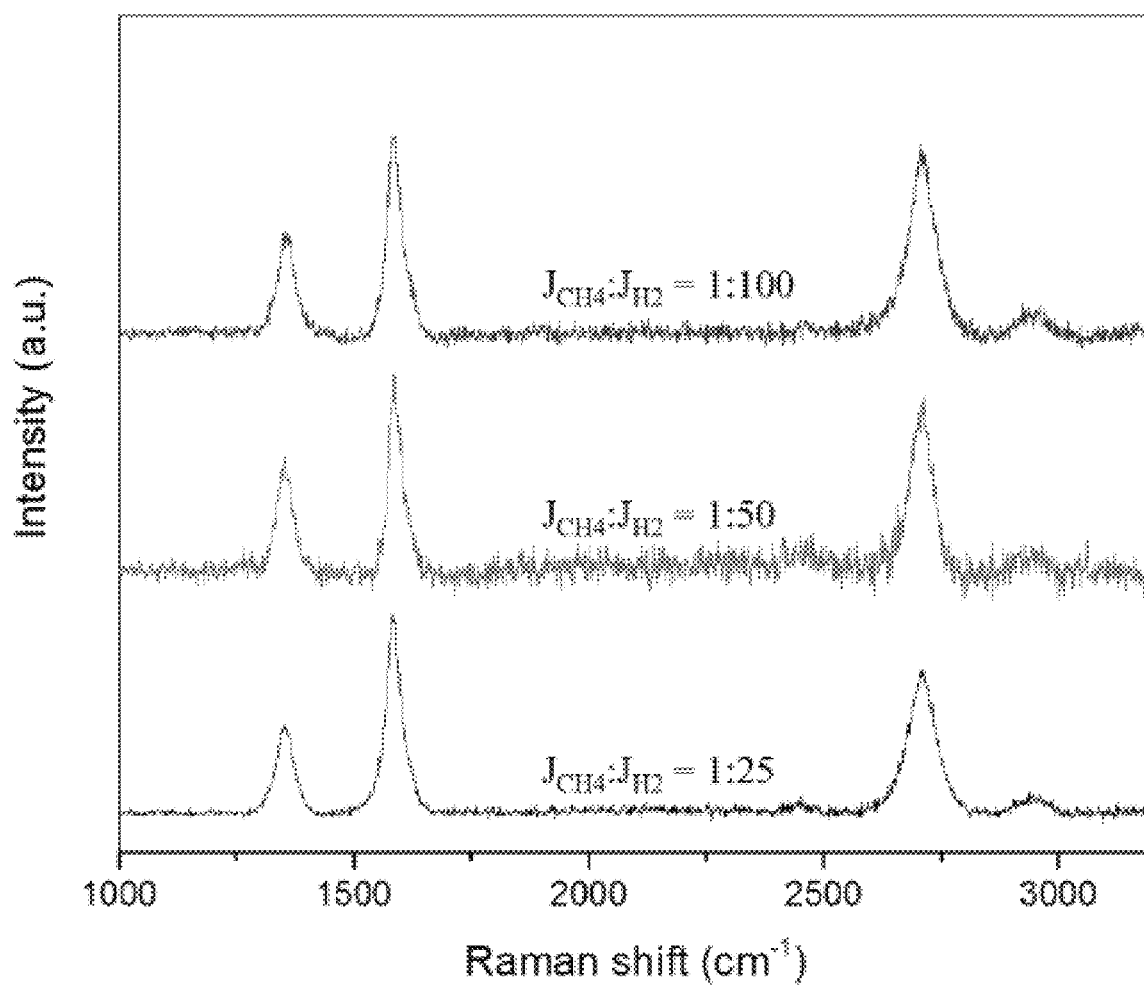

FIG. 12 provides Raman spectra of graphene grown on Cu at different $J_{CH4}:J_{H2}$ ratios. Substrate background signals are all subtracted. The spectra are normalized with the G band.

Figure 13:
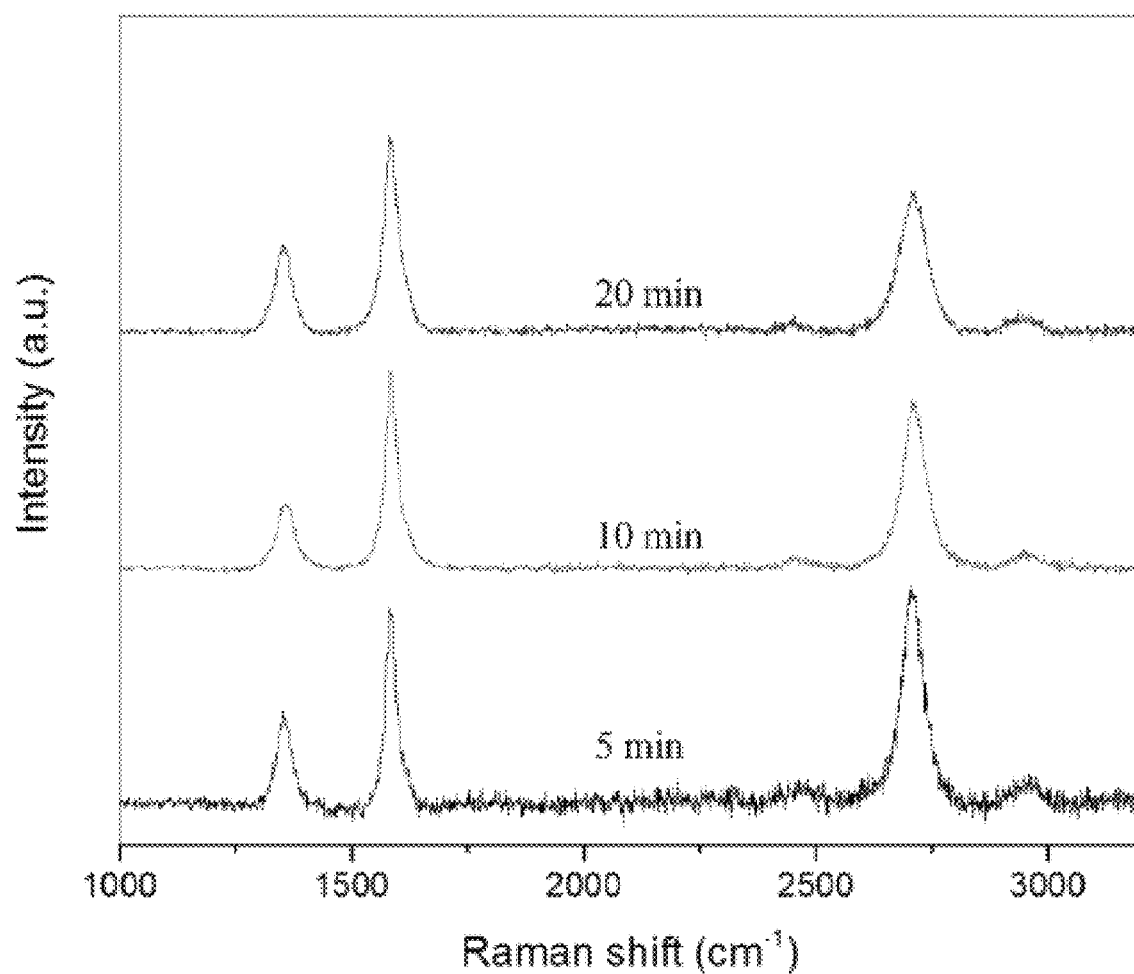

FIG. 13 provides Raman spectra of graphene grown on Cu at different growth time. Substrate background signals are all subtracted. The spectra are normalized with the G band.

Figure 14:
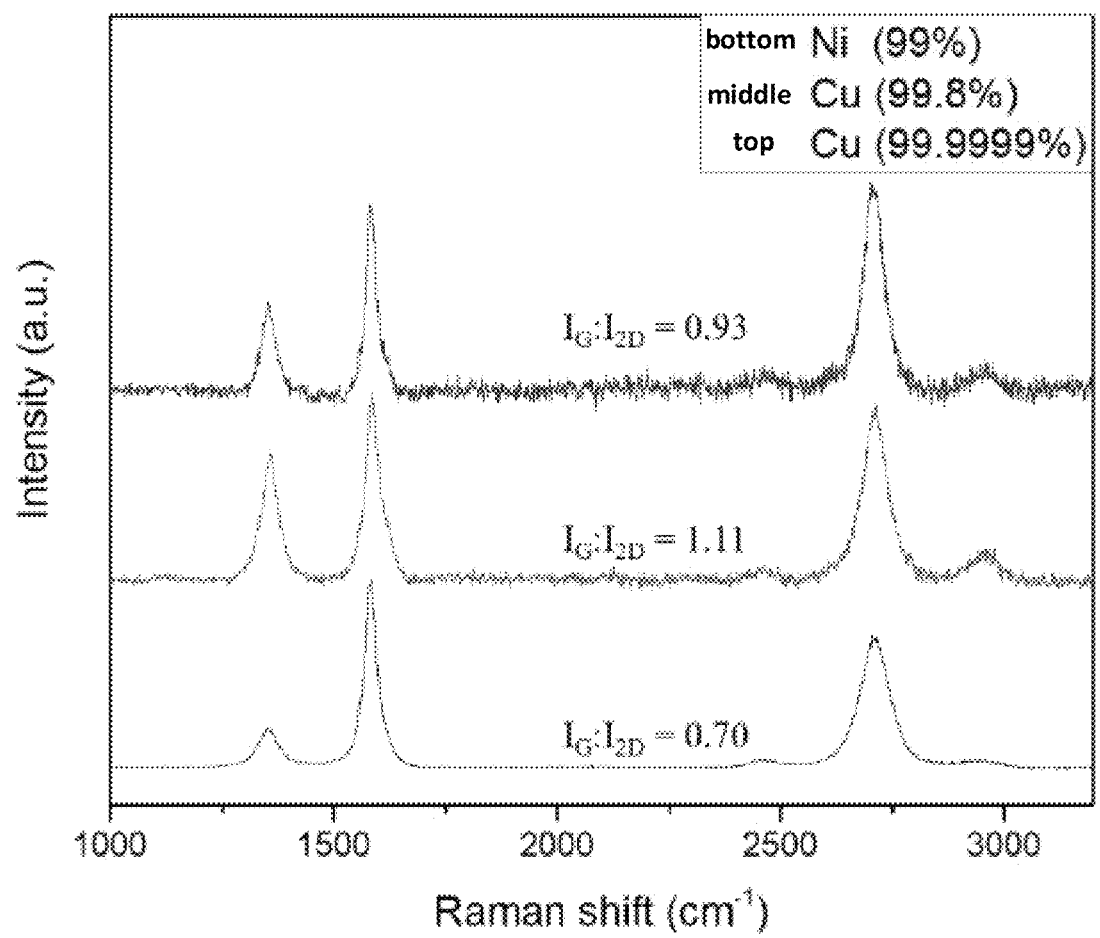

FIG. 14 provides Raman spectra of graphene grown on different substrates. Substrate background signals are all subtracted. The spectra are normalized with the G band.

Figure 15:
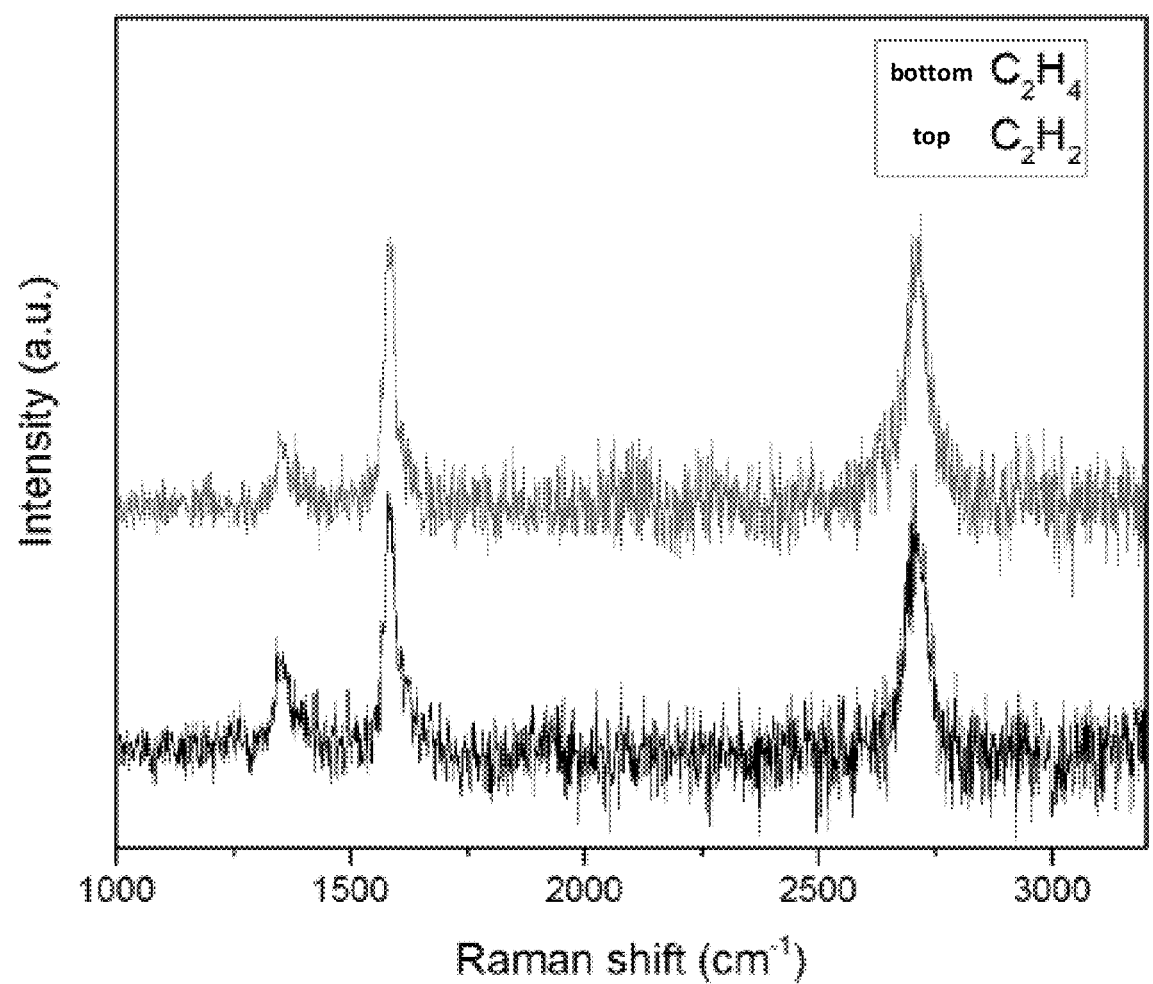

FIG. 15 provides Raman spectra of graphene grown on Cu using $C_2H_4$ and $C_2H_2$. Substrate background signals are all subtracted. The spectra are normalized with the G band.

Figure 16:
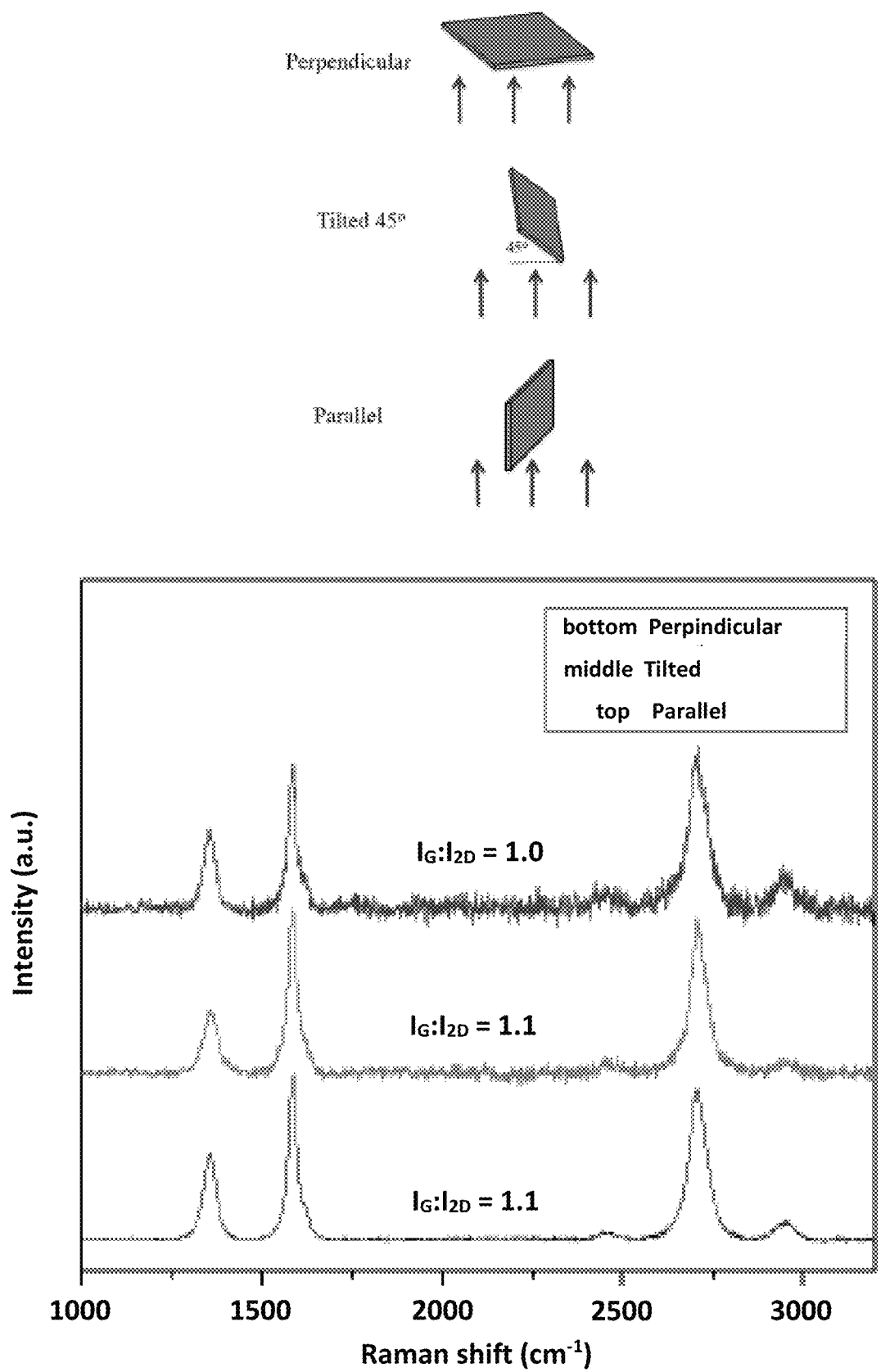

FIG. 16 provides a schematic of the substrate placed perpendicular, tilted and parallel against the flow (left) and Raman spectra of graphene grown on Cu with different orientations. Substrate background signals are all subtracted. The spectra are normalized with the G band.

DETAILED DESCRIPTION OF THE INVENTION

A modified multi-element inverse-diffusion flames (m-IDFs) (non-premixed) burner setup is utilized to synthesize mono-layer and/or defective graphene on metal substrates. The defect level using unconfined flame synthesis can be tuned by adjusting various parameters such as temperature, growth time, carbon precursor, and hydrogen flow rate. An effective etching phenomenon on graphene layers reduces the number of layers by applying a post-growth hydrogen annealing process using the same setup, where the hydrocarbon precursor flow is turned off, while the hydrogen m-IDFs are maintained. Such effect enables the growth of mono-layer graphene in an open-atmosphere environment. The hydrogen annealing technique can be utilized to create defects such as nanoscale pores and vacancies (e.g., at the atomic scale) in the graphene layer(s). The D-peak-to-G-peak intensity ($I_D/I_G$) ratio increases dramatically after hydrogen annealing when as-synthesized graphene on Cu exhibits an initial ratio of at least about 0.6. However, the $I_D/I_G$ ratio does not change significantly after annealing if the initial ratio is lower than about 0.6. By controlling the annealing condition, highly-defective graphene films with tunable defects are directly synthesized using a two-step flame method. Such defective graphene has a myriad of applications, such as ultrafiltering membranes, gas sensors, and optoelectronics and can be readily doped with metals (e.g., by using a solution of metal salts).

Using the modified multiple-inverse-diffusion-flame burner, monolayer graphene on copper substrate has been synthesized. As-received metal substrate with a native oxide layer can be pre-treated in a hydrogen reducing atmosphere. For example, the burner can be run initially with hydrogen as the sole fuel, which provides the hydrogen needed to reduce any residual oxide layer. Upon placing the copper foil/substrate downstream of the flames (e.g., for about 10 minutes), a hydrocarbon gas is added to the flow through the elevated/extended precursor-delivery lines. The copper foil/substrate is kept in the same position (e.g., for about an additional 10 minutes) and then the hydrocarbon gas is removed from the flame (e.g., shut off). The copper foil/substrate is kept in the same position (e.g., for about an additional 10 minutes) and then removed from above the hydrogen flame. Raman spectra was used to confirm the presence of monolayer graphene.

A continuous rasterizing process based on the above procedure can be used to coat large area surfaces (see, e.g., FIG. 1B). Briefly, a first burner reduces the oxide layer on the substrate surface; a second burner synthesizes graphene on the surface; and a third burner anneals the graphene to change its characteristics. A monitoring system (e.g., Raman and Photoluminescence) may follow the burners to assess the coating quality.

Using the modified multiple-inverse-diffusion-flame burner, nano-defective graphene on copper has also been directly synthesized. Upon placing the copper foil/substrate downstream of (e.g., above) the flames (e.g., for about 10 minutes), a hydrocarbon gas (e.g., methane) is added to the flow through the elevated/extended precursor-delivery lines. The copper foil/substrate is kept in the same position (e.g., for about an additional 5 minutes), and then the hydrocarbon gas is removed from the flame (e.g., shut off). The foil is kept in the same position (e.g., for about an additional 0 to 10 minutes), and then removed from above the flame. Raman spectra can be used to confirm the presence of nano-defective graphene and to identify the defective level for samples with different post-growth hydrogen annealing times. A high-resolution TEM image shows the chemical structure of flame-synthesized defective graphene. Many kinds of graphene structural defects like vacancy, double vacancy, and Stone-Wales defect can be clearly observed by comparing the enlarged TEM image of defective graphene and pristine flame-synthesized monolayer graphene at the same magnitude. UV-Visible Spectroscopy is used to determine the band-gap structure of graphene in the presence of defects. The band-gap energies can be measured via the Diffuse Reflectance Derivative Peak Fitting (DPR) method, where the center of each Gaussian peak fit to the first derivative, $dR_\infty/d\lambda$, spectra corresponds to a band gap. The band energies of defective graphene in the low-energy range (800 nm to 1000 nm) are observed. Graphene-based ultrafiltration membrane is fabricated by transferring as-synthesized nano-defective graphene from copper substrate to a standard precision 5-µm round aperture. The estimated open-area diameter and percentage respect to NDG with different $I_D/I_G$ ratios are derived from conductance tests.

The instant invention describes methods for the synthesis of monolayer graphene and/or nanodefective graphene. In a particular embodiment, the methods of the instant invention comprise the use of a modified multi-element, inverse-diffusion flames (non-premixed) burner. Multi-element, inverse-diffusion flame burners are described, for example, in WO 2012/116286, incorporated by reference herein. The burner comprises an array of tiny stabilized flames that form a uniform flat-flame front, with respect to substrates placed well downstream. Each of the diffusion flames is run in the inverse mode ("under-ventilated"). Generally, for each tiny stabilized flame of the burner, the oxidizer (e.g., air, oxygen, etc.) is provided by a center feed tube and the fuel (e.g., hydrogen or a hydrocarbon precursor such as methane, ethylene, acetylene, etc.) is provided by tubes which surround it. The burner is capable of continuous operation in open and closed environments. The burner may be operated in an ambient-air environment or an inert environment (e.g., an inert gas such as $N_2$, Ar, He).

In a particular embodiment, the multi-element, inverse-diffusion flames burner of the instant invention is modified such that the precursor delivery tubes are extended beyond (e.g., above) the main burner surface. For example, the precursor delivery tubes are about 1 mm to about 10 mm above the main burner surface, particularly about 2 mm to about 8 mm; about 3 mm to about 7 mm; about 4 mm to about 6 mm; or about 5 mm above the main burner surface. FIGS. 1 and 2 depict the modified multi-element, inverse-diffusion flames burners of the instant invention.

The instant invention encompasses the synthesis of carbon-based, particularly graphene, materials or structures (e.g., nanostructures, microstructures, surface structures of materials). For example, the structure may be a particle, granule, fiber, wire, preform, composite, polymer, film, disc, plate, sheet, or flake. In a particular embodiment, the structure is a film, disc, plate, sheet, or flake. In a particular embodiment, the structure is a graphene sheet. The structures may be multi-layered, bi-layered, or mono-layered.

In a particular embodiment, the methods of the instant invention involve depositing pyrolyzed species onto a heated substrate to generate carbon-based materials (e.g., nanostructures) such as graphene sheets. As explained above, the stabilized flame of the multiple-flame burner may comprise an oxidizer-feed tube in the center and fuel-feed tubes surrounding it. In a particular embodiment, the oxidizer is air or $O_2$. The $O_2$ can be diluted to any desired concentration with inert gases (e.g., $N_2$). In a particular embodiment, the fuel is hydrogen or a hydrocarbon precursor such as methane, ethylene, acetylene, or mixtures thereof. In a particular embodiment, the modified multi-element, inverse-diffusion flames burner also comprises hydrogen-only feed tubes.

While the structures of the instant invention are typically referred to as graphene, the structures may also be doped or alloyed. For example, methods of synthesizing graphene with nitrogen and/or boron, as well as other elements, is also encompassed by the instant invention. For example, ammonia ($NH_3$) can be introduced with the hydrocarbon fuel (e.g., $CH_4$) to provide a source of nitrogen, such that the $NH_x$ species formed during flame decomposition are incorporated directly into the graphene structure. Similarly, borane ($BH_3$) or borane-ammonia ($H_3NBH_3$) can be introduced with the hydrocarbon fuel to provide a source of boron and/or nitrogen. It is possible that the hexagonal symmetry of the graphene can be retained, while incorporating boron or boron nitride into the structure. Additionally, halogenation can be applied to incorporate fluorine and other elements into the structure using the appropriate precursors. Properties of the nanostructures may be altered. In addition, the defective or highly-defective graphene can also be doped by "filtering" a metal ion solution such that the metal ions fill in the nanopores or atomic vacancies.

The substrate upon which the pyrolyzed species are deposited is solid substrate, particularly a metal substrate. Examples of substrates include, without limitation: copper, nickel, steel, transition metals, alloys thereof, and spinels thereof. In a particular embodiment, the substrate is copper. The substrate may be ultrapure (e.g., ≥99.999% pure, or ≥99.9999% pure). The substrate may be less than ultrapure (e.g., ≥98% pure, ≥99% pure, ≥99.5% pure, ≥99.7% pure, ≥99.8% pure, or ≥99.9% pure, while being less than ultrapure). When defective graphene is being synthesized, the substrate is less than ultrapure. In a particular embodiment, the substrate is Cu which is about 99% to about 99.9% pure.

The substrates themselves can translate and/or rotate effortlessly in a continuous production mode. In one embodiment, the pyrolysis vapors in the hot gas stream uniformly coat flat substrates with nanostructures (e.g., films). The reactor may direct the gas stream onto a moving belt, thereby enabling continuous fabrication. The burner(s) may also be moved, oriented, and/or rasterized across a surface. Indeed, operation of a burner of the instant invention has no scaling problems by allowing for stability at all burner diameters, where the issuing flow velocity can be independent of the burner diameter. The post-flame gases downstream are quasi 1-D in that they are radially-uniform in temperature and chemical species. Thus, larger burners and substrates can be used, while ensuring uniform growth rates at the substrate. Additionally, the substrates can be placed on a conveyor-belt for high-production throughput or the burner can be translated or rasterized to generate a very large area coating or deposit. Rotating the substrates (e.g., in spin coating) to maintain flatness and uniformity of the growth layers can also be performed. Further, for production purposes, scalability can be readily accomplished by laying side-by-side several (e.g., identical) honeycomb structures (square or hexagon shaped) to form any desired burner size, shape or form.

In a particular embodiment, the methods of the instant invention encompass pre-treating the substrate to remove any oxide layer. For example, a copper substrate may be pre-treated prior to graphene growth. The unwanted oxide layer on the metal substrate may be removed via hydrogen reduction by using only hydrogen as fuel (e.g., >1 global equivalence ratio) in the modified multiple inverse-diffusion flame burner. After pre-treatment, a hydrocarbon precursor is added to grow the graphene in a continuous manner. In a particular embodiment, the substrate is pre-treated with only hydrogen as fuel in the burner for about 1 second to about 30 minutes, particularly about 1 minute to about 20 minutes, about 2 minutes to about 15 minutes, about 5 minutes to about 15 minutes, or about 10 minutes.

In accordance with the instant invention, methods for synthesizing monolayer graphene are provided. In a particular embodiment, the method comprises: 1) reducing a metal substrate (e.g., Cu) in a modified, multiple inverse-diffusion flame burner wherein hydrogen ($H_2$) is used as the only fuel; 2) adding a hydrocarbon precursor through the fuel lines (the modified (elevated) fuel lines) of the modified, multiple inverse-diffusion flame burner to synthesize the graphene; and 3) annealing the flame-synthesized graphene by running the modified, multiple inverse-diffusion flame burner wherein hydrogen ($H_2$) is used as the only fuel (i.e., the flow of hydrocarbon precursor is stopped). In a particular embodiment, an inert gas (e.g., Ar) is present during step 1, 2, and/or 3. In a particular embodiment, Raman spectroscopy (e.g., online) is performed to confirm the presence of monolayer graphene. In a particular embodiment, the method further comprises transferring (e.g., via wet chemistry method) the monolayer graphene to another substrate.

In a particular embodiment, the temperature of the modified, multiple inverse-diffusion flame burner is greater than about 500° C., particularly greater than about 850° C., greater than about 900° C., greater than about 950° C., greater than about 1000° C., or is about 1000° C. In a particular embodiment, the temperature of the modified, multiple inverse-diffusion flame burner is about 950° C. to about 1050° C. or about 975° C. to about 1025° C. The temperature of the burner should remain below the melting temperature of the substrate (e.g., ~1085° C. for copper).

In a particular embodiment, the pre-treatment of the substrate with only hydrogen as fuel in the burner (step 1) is for about 1 second to about 30 minutes, particularly about 1 minute to about 20 minutes, about 2 minutes to about 15 minutes, about 5 minutes to about 15 minutes, or about 10 minutes.

In a particular embodiment, step 2 comprises using hydrogen and a hydrocarbon precursor (e.g., $CH_4$) as fuel. The input ratio of the hydrocarbon precursor and hydrogen can be from about 1:1 to about 1:1000, particularly about 1:25 to about 1:250, about 1:50 to about 1:200, or about 1:100. Step 2 can be performed for as long as graphene growth is desired (particularly for at least about a minute or for at least 5 minutes).

In a particular embodiment, the graphene annealing with only hydrogen as fuel in the burner (step 3) is for about 1 second to about 30 minutes, particularly about 1 minute to about 20 minutes, about 2 minutes to about 15 minutes, about 5 minutes to about 15 minutes, or about 10 minutes. The annealing step may be performed until the $I_G/I_{2D}$ ratio of the graphene is reduced to less than about 1.0, less than about 0.9, less than about 0.8, less than about 0.7, less than about 0.6, less than about 0.5, or less than about 0.4.

Using the modified multiple-inverse-diffusion-flame burner, nano-defective graphene on copper substrate has also been directly synthesized. Upon placing the copper foil/substrate downstream of the flames (e.g., for about 10 minutes), a hydrocarbon gas is added to the flow through the elevated/staged precursor-delivery lines. The copper foil/substrate is kept in the same position (e.g., for about an additional 5 minutes), and then the hydrocarbon gas is removed from the flame (e.g., shut off). The foil is kept in the same position (e.g., for about an additional 0 to 10 minutes), and then removed. Raman spectra is used to confirm the presence of nano-defective graphene and to identify the defective level for samples with different post-growth hydrogen annealing time.

In accordance with the instant invention, methods for synthesizing nano-defective graphene (also referred to as nanoporous graphene) are provided. Nano-defective graphene is graphene with atomic-scale defects (e.g., vacancies, Stone-Wales defect) and/or nano-scale defects (e.g., grain boundaries, overlaps) and pores. In a particular embodiment, the method comprises: 1) reducing a metal substrate (e.g., Cu) in a modified, multiple inverse-diffusion flame burner wherein hydrogen ($H_2$) is used as the only fuel; 2) adding a hydrocarbon precursor through the fuel lines (the modified (elevated) fuel lines) of the modified, multiple inverse-diffusion flame burner to synthesize the graphene; and, optionally, 3) annealing the flame-synthesized graphene by running the modified, multiple inverse-diffusion flame burner wherein hydrogen ($H_2$) is used as the only fuel (i.e., the flow of hydrocarbon precursor is stopped). In a particular embodiment, an inert gas (e.g., Ar) is present during step 1, 2, and/or 3. In a particular embodiment, Raman spectroscopy is performed to confirm the presence of nano-defective graphene. In a particular embodiment, the method further comprises transferring (e.g., via wet chemistry method) the nano-defective graphene to another substrate.

The nano-defective graphene of the invention may exhibit band gaps. Further, the properties of the nano-defective graphene are readily tunable with the methods of the instant invention (see Examples below). For example, the degree and/or amounts of defects and/or the band gaps can be modulated by varying the conditions (e.g., the length of the various steps) of the method. The resultant nano-defective graphene may be used for ultrafiltration (e.g., water desalination, ion-selective membranes, gas separation membranes, and gas molecule sensors). Additionally, the nano-defective graphene, with its atomic-scale vacancies, can be readily doped (e.g., with atoms or molecules for enhanced performance for various applications such as optoelectronics and catalysis).

In a particular embodiment, the temperature of the modified, multiple inverse-diffusion flame burner is greater than about 850° C., greater than about 900° C., greater than about 950° C., greater than about 1000° C., or is about 1000° C. In a particular embodiment, the temperature of the modified, multiple inverse-diffusion flame burner is about 950° C. to about 1050° C. or about 975° C. to about 1025° C. The temperature of the burner should remain below the melting temperature of the substrate (e.g., ~1085° C. for copper).

In a particular embodiment, the pre-treatment of the substrate with only hydrogen as fuel in the burner (step 1) is for about 1 second to about 30 minutes, particularly about 1 minute to about 20 minutes, about 2 minutes to about 15 minutes, about 5 minutes to about 15 minutes, or about 10 minutes.

In a particular embodiment, step 2 comprises using hydrogen and a hydrocarbon precursor (e.g., $CH_4$) as fuel. The input ratio of the hydrocarbon precursor and hydrogen can be from about 1:1 to about 1:1000, particularly about 1:25 to about 1:250, about 1:50 to about 1:200, or about 1:100. Step 2 can be performed for as long as graphene growth is desired (particularly for at least about a minute or for at least 5 minutes). In a particular embodiment, the substrate is less than ultrapure (e.g., less than 99.99% pure or less than 99.9% pure).

As stated hereinabove, step 3 in the method is optional. The graphene should have an $I_D/I_G$ ratio of about 0.6 or higher prior to performing step 3. In a particular embodiment, the graphene annealing with only hydrogen as fuel in the burner (step 3) is for about 1 second to about 30 minutes, particularly about 1 minute to about 20 minutes, about 2 minutes to about 15 minutes, about 5 minutes to about 15 minutes, or about 10 minutes. The annealing step may be performed until the $I_D/I_G$ ratio of the graphene is increased to a desired amount (e.g., greater than about 0.8, greater than about 1.0, or greater than about 1.2).

The following examples describe illustrative methods of practicing the instant invention and are not intended to limit the scope of the invention in any way.

Example 1

Modified Multi-Element Inverse-Diffusion Flame Burner

A schematic of the modified multi-element inverse-diffusion flame setup is shown in FIG. 1. Each distinct flame in the planar array of the main burner surface runs in an inverse mode ("under-ventilated"). Distinct precursor delivery tubes are staged above/beyond the main burner surface at a fixed height of 5 mm in order to deliver hydrocarbon precursor (e.g., methane, ethylene, acetylene, etc.) to the post-flame region directly. This design prevents hydrocarbon precursor from fully oxidizing/decomposing by bypassing the multiple flames. At the burner base, oxidizer (e.g., air, oxygen, or other oxidizing agent (e.g., $O_3$, $F_2$, $Cl_2$, etc.) is delivered through small individual oxidizer tubes. Both precursor and oxidizer tubes are made of stainless steel and mounted through a stainless steel honeycomb fixture. Fuel (e.g., hydrogen, methane, ethylene, acetylene, etc.) is delivered through the empty channels of the honeycomb fixture. Water cooling is achieved by use of copper coil wrapped around the burner. A quartz cylinder encompassing the flame and post-flame regions prevents air permeation from the ambient and reduces convection heat losses. The quartz cylinder is open at the downstream end, after a certain length, exhausting to a hood. Therefore, the setup is open to atmospheric condition.

All the gas flow rates were regulated by mass flow controllers (MFCs). A LabVIEW program on a PC was used to control the MFCs for convenient and precise flow delivery of multiple gases, reducing the experimental error from the control side, which ensures the reproducibility of the results. Excess fuel and precursor are consumed in an after-burner mounted downstream of the open end of the quartz cylinder before exhausting into a hood. The substrate is mounted to a rod and inserted into the post-flame flow field from the open end of the quartz cylinder. The rod has threads that enable adjustment of the substrate height with respect to the burner base. A sidewall slot is machined into the quartz cylinder to allow access for an igniter and thermocouple.

Numerical Simulation to Design Modified Burner

A flame simulation was utilized using ANSYS Fluent to design the height of precursor tubes prior to modifying the m-IDF burner. Gambit was used to define the geometry and mesh, which comprises four individual flames. Both two-step laminar reaction for methane/air based on Arrhenius kinetics and GRI-Mech 1.2 were used to model the flames and guide construction of the final burner. Previous experimental data serve as flow rate inputs in the simulation. Employing adiabatic radial boundary conditions, the results of using the two-step laminar reaction mechanism was determined. The temperatures from the individual flames merge at ~5 mm above the tubing exits (the length of the tubes is 10 mm), and the radial boundary has a constant temperature ~1600 K after flames merge. A simulation of constant temperature radial boundary condition at 1600 K using detailed chemical kinetics, i.e., GRI-Mech 1.2 mechanism, was then performed. The individual flame temperatures merge in a shorter distance than they do in using the two-step mechanism. Based on the simulation results, the m-IDF burner design was modified with distinct precursor tubes elevated above the burner surface at a fixed height of 5 mm.

Temperature Measurement

Gas-phase temperatures were measured using a 125 μm Pt/Pt-10% Rh thermocouple (Stype, OMEGA, Model: P10R-005). A silica coating was applied to the thermocouple junction to prevent catalytic oxidation on the Pt-based thermocouple. The coating was performed using a small co-flow burner, where silicone oil was injected using a syringe pump. The coating uniformity (3±0.5 μm) was confirmed under a microscope. The thermocouple was held for 2 seconds within the flame, and the procedure was repeated multiple times to minimize error.

Sample Preparation

Substrates used for these experiments consist of various metals and non-metals including copper foil and plate, nickel foil, stainless steel foil, silicon wafer and several others. All substrates were cut into 1.5 cm×1.5 cm squares and placed above the burner, but within the encompassing quartz cylinder. The substrate can be positioned parallel to the flame flow, or perpendicular to the flow, or tilted an angle with the flow. In all cases, no prior substrate preparation was performed. A list of the substrate materials is shown in Table 1.

TABLE 1

List of substrates.

| Material | Purity | Thickness | Company | Part # |
|---|---|---|---|---|
| Copper Foil | 99.8% | 0.025 mm | Alfa Aesar | 13382 |
| Puratronic Copper Foil | 99.9999% | 0.25 mm | Alfa Aesar | 42974 |
| Puratronic Copper Foil | 99.9999% | 0.1 mm | Alfa Aesar | 42973 |
| Nickel Foil | 99% | 0.025 mm | Alfa Aesar | 12722 |
| Silicon Wafer (100) | *N-Phosphorus | 381 microns | El-Cat | 30 |
| Silicon Wafer (100) | *P-Boron | 500 microns + 300 nm oxide | University Wafer | 43 |
| Stainless Steel 304 Foil | N/A | 0.025 mm | Alfa Aesar | 41580 |
| Stainless Steel 304L Foil | N/A | 0.15 mm | Goodfellow | FA140230 |
| Stainless Steel 316L Foil | N/A | 0.05 mm | Goodfellow | FF210250 |

In-Situ Raman Spectroscopy of Gas-Phase Species in the Flow Field

The second harmonic (532 nm) of an injection-seeded Nd:YAG laser (Quanta-Ray LAB 170) operating at 10 Hz (~9 ns FWHM) was utilized for in-situ Raman measurement of gas-phase species. The laser beam was focused by a 500-mm focal-length plano-convex fused-silica lens to a probe volume with a waist diameter of approximately 200 μm. A spectrometer (Acton SpectraPro-500i) with a 600 groove/mm grating and an ICCD camera (Princeton Instruments, PIMAX 1300HQ-25-FO) were used for imaging. The slit of the spectrometer was 200 μm. An oscilloscope (Agilent Infinium 54845A, 1.5 GHz sampling rate) was employed to monitor the timing of the laser pulse and camera gating. The camera gate width time was set to 20 ns to reduce interference and background. The burner was mounted on a 2-D translator in order to move in x and z directions. The emissions were collected at 90° by a 400-mm focal-length achromatic lens, then passed through a Raman holographic notch filter (Kaiser HSPF-532.0-2.0), and finally focused by a 300-mm focal-length achromatic lens onto the slit of a 0.5 m imaging spectrometer.

Ex Situ Raman Spectroscopy of as-Synthesized Nanomaterials

Raman scattering is the inelastic scattering of an incident photon upon interaction with an atom or molecule. When incidents photons are scattered from matter, most of them are elastically scattered (Rayleigh scattering) at the same frequency as the incident photons. If the scattered photons have lower frequencies than that of incident photons, the scattering is called Stokes scattering, giving the Stokes lines in the Raman scattering spectrum. To the contrary, if the scattered photons have higher frequencies, the scattering is called Anti-Stokes scattering, giving the Anti-Stokes lines.

Raman spectroscopy is a widespread spectroscopic technique used to observe vibrational and rotational modes within a system. It has been extensively used in characterizing various carbon systems (e.g., amorphous carbon, metallic and semiconducting SWNTs, graphite, etc.) with only a few prominent features including a couple of very intense bands in the 1000-2000 cm$^{-1}$ range and few other second-order modulations (Ferrari, A. C. (2007) Solid State Commun., 143(1-2):47-57). In the Raman spectra of carbon, the main bands are called G and D peaks, which are located at around 1560 and 1360 cm$^{-1}$, respectively, for visible excitation. The G peak is related to the bond stretching of all pairs of sp$^2$ atoms in both rings and chains, and the D peak is related to the breathing modes of sp$^2$ atoms in rings (Ferrari, A. C. (2007) Solid State Commun., 143(1-2):47-57). All sp$^2$ carbon materials normally present a strong peak called G' (or 2D) peak in the range 2500-2800 cm$^{-1}$. For monolayer graphene, the G peak appears at 1582 cm$^{-1}$, and the G' peak at about 2700 cm$^{-1}$, using 514 nm excitation (Malard, et al. (2009) Physics Rep., 473(5-6):51-87). At the edge of a graphene sample or in the case of a disordered sample, a disordered-induced D peak manifests at around 1350 cm$^{-1}$ (Malard, et al. (2009) Physics Rep., 473(5-6): 51-87). In defective graphite, there is a so-called D' peak (at ~1620 cm$^{-1}$) resulting from the double resonance process (Malard, et al. (2009) Physics Rep., 473(5-6):51-87). The ratio between G and G' peaks can be used to estimate the number of graphene layers and the ratio between D and G peaks can be used to measure the disorder induced from edges, impurities, domain boundaries, wrinkles, etc.

Transmission Electron Microscopy

A beam of accelerated electrons is transmitted through an ultra-thin specimen in a transmission electron microscope (TEM). The wave interactions of the electrons transmitted through the specimen give significantly higher-resolution information compared with optical microscopes since the De Broglie wavelength of electrons is many orders of magnitude smaller than that for visible light. TEM is widely used for imaging crystal structures of nanomaterials. Another main function of TEM is selected area electron diffraction (SAED) that can be used to determine the crystallinity of samples. Herein, a high-resolution TEM (HRTEM; JEOL 2010F) was used to characterize graphene samples.

Atomic-Force Microscopy

Atomic-force microscopy (AFM) is a type of scanning probe microscopy with nanoscale resolution. A cantilever with a sharp probe at its end is used to scan the surface depth profile of the samples. The AFM can be operated in either static (contact) mode or dynamic (tapping or non-contact) mode for a number of applications. In static mode, where the probe tip is dragged across the specimen surface, a firm contact with the solid surface is required. In tapping modes, short-range forces are detected by oscillating the cantilever probe tip close enough to the sample surface without contact. Tapping mode—which prevents the tip from sticking to or damaging the surface—is more suitable for thin-layer materials like graphene. AFM (Bruker Dimension FastScan) was employed to determine the morphology and uniformity of graphene samples on a silicon wafer (surface roughness ~1 nm).

Example 2

The breakdown of the self-limiting mechanism makes it difficult to deposit monolayer graphene (MLG) on Cu at atmospheric pressure. However, by reducing the methane concentration in the gas mixture, MLG has been achieved in atmospheric-pressure chemical vapor deposition (APCVD) (Bhaviripudi, et al. (2010) Nano Lett., 10(10):4128-4133). The effect of methane flow rate and methane partial pressure has been studied on graphene growth rate and domain size (Li et al. (2010) Nano Lett., 10(11):4328-4334). Lower flow rate and partial pressure of methane lead to lower growth rate and less nucleation density of graphene, which are essential for the growth of large-crystal monolayer films. Graphene crystals grown from different nucleation sites with different orientations can only coalesce into polycrystalline films (Wang et al. (2012) J. Am. Chem. Soc., 134, no. 8, pp. 3627-3630). In flame synthesis, the total flow rate and carbon flux are much higher than that in APCVD and low-pressure chemical vapor deposition (LPCVD), in order to stabilize the flames, which can lead to smaller graphene domains and adlayers. That is why few-layer graphene (FLG) grown in open-atmosphere flame synthesis exhibits a higher D-peak to G-peak ratio ($I_D/I_G$) ratio and sheet resistance than that for CVD-grown graphene (Memon et al. (2011) Carbon 49(15):5064-5070). Moreover, the activation energy of graphene nucleation in atmospheric pressure (9 eV) is substantially higher than that in low pressure (4 eV) (Vlassiouk, et al. (2013) J. Phys. Chem. C, 117(37):18919-18926).

Various parameters have been studied for flame synthesis of graphene. After optimization of synthesis conditions, including substrate material, temperature, flow rate, and growth time, bilayer graphene (BLG) was produced for the first time using an open-atmosphere flame synthesis method. However, by further lowering methane concentration to the condition of APCVD, MLG was not observed for the cases examined. The high flow flux and large numbers of combustion products (e.g., $H_2O$, OH, CO, $CO_2$) seem to make it difficult to directly translate conditions for CVD to that for flame synthesis.

Hydrogen plays a vital role in graphene growth as an activator of surface-bound carbon and an etching reagent for the "weak" carbon-carbon bonds that controls the graphene domains (Vlassiouk, et al. (2011) ACS Nano, 5(7): 6069-6076). The minimum temperature for effective hydrogen etching is 850° C. (Vlassiouk, et al. (2011) ACS Nano, 5(7): 6069-6076). For the flame synthesis of graphene, the role of hydrogen has been mainly investigated for the substrate pretreatment stage and the growth stage (Memon, et al. (2013) Proc. Combustion Inst., 34(2):2163-2170). A post-growth hydrogen thermal etching on APCVD-synthesized graphene has been performed at 1000° C. for 1.5 minutes to obtain MLG (Yao, et al. (2012) Carbon 50(14):5203-5209). Moreover, a high-temperature thermal annealing process was found to be effective for curing the defects in graphene, calling it a "self-healing" mechanism (Chen, et al. (2013) Applied Phys. Lett., 102(10):103-107). Herein, hydrogen annealing is employed to change the quality of flame-synthesized graphene.

Experiment

The synthesis setup used herein is a modified multi-element inverse-diffusion flames (m-IDFs) burner. The experimental process can comprise two operations during a single experiment using the same modified m-IDFs burner: 1) flame synthesis of graphene, 2) hydrogen annealing of flame-synthesized graphene (see FIG. 2). Hydrogen annealing was performed on flame-synthesized BLG on Cu. Prior to synthesis, the Cu substrate was reduced in the hydrogen environment at 1000° C. for 10 minutes, using the modified m-IDFs burner running only hydrogen as fuel with no flow through the extended precursor tubes, to remove any oxide layer and enlarge the grain size. Then methane was introduced into post-flame gases via the extended precursor delivery tubes to initiate graphene growth on Cu. The growth temperature was maintained at 1000° C., and the input ratio between $CH_4$ and $H_2$ was 1:100, where hydrogen serves as the fuel emanating from the base of the modified m-IDFs burner. After 5 minutes of growth, methane supply through the precursor tubes was shut off, but hydrogen continued to flow sustaining the m-IDFs at the base of the burner. As such, the substrate experiences annealing in a hydrogen (and argon inert) environment at 1000° C. for 10 minutes. After annealing in the hydrogen-rich environment produced by the underventilated multiple flames at the base of the burner, the m-IDFs were extinguished simply by shutting down the oxidizer flow. Finally, the substrate was cooled down to room temperature with a continuous flux of inert argon gases.

As-synthesized graphene was characterized by Raman spectroscopy (Renishaw 1000, 514 nm laser wavelength, 50× magnitude). Transmission electron microscopy (TEM, JOEL 2010F, 200 kV) was employed to study the crystal structure and morphology of graphene samples. TEM sample was prepared by transferring graphene to a lacey TEM grid by following the wet-chemistry process. Atomic-force microscopy (Dimension FastScan, Bruker Nano) with probes (Fastscan A, 5 nm tip radius) was used for tapping mode scanning and imaging of the graphene samples on $Si/SiO_2$.

Graphene deposited on copper can be transferred onto other substrates for characterization or fabrication of devices. The common transfer process of graphene is by using wet-chemistry method. As-grown graphene on Cu is first spin-coated with a poly(methyl methacrylate) (PMMA) protective coating. After the PMMA coating is cured, the Cu substrate is etched away by using iron nitride or iron chloride aqueous solution. The PMMA/Graphene stack is washed in deionized (DI) water and transferred to the target substrate. The last step is to remove the PMMA coating with acetone. However, the traditional process can cause the graphene to form cracks because of intrinsic mechanical properties of monolayer graphene. Before removing the initial PMMA layer, redepositing another layer of PMMA can reduce the cracks of graphene after the transfer process (Li et al. (2009) Nano Lett., 9(12):4359-4363). Transfer to an insulating surface (e.g., silicon or quartz) is required to measure optical and electronic properties of synthesized graphene. Silicon wafer is a common support material for graphene-based semiconductor applications.

Results

Typical Raman spectra of graphene sample before and after hydrogen annealing are shown in FIG. 3. For a 10-minute post-growth treatment at 1000° C., the overall $I_G/I_{2D}$ ratio is significantly reduced from ~1 to ~0.5, which means a BLG is converted into a MLG. This result demonstrates that hydrogen reduces the number of graphene layers by effectively etching additional layers and growth fronts through hydrogen's interactions with "weak" carbon-carbon bonds and dangling bonds. The D-peak to G-peak intensity $(I_D/I_G)$ ratio is nearly constant before and after annealing. The "self-healing effect" has not been observed in this case. The self-healing of defective graphene with nanoscale vacancies induced by an argon plasma was observed when thermal annealing samples in an argon atmosphere (Chen, et al. (2013) Appl. Phys. Lett., 102(10):103-107). The curing of the vacancies can be due to the mobility and rearrangement of carbon atoms on the Cu surface at high temperature. There are two possible reasons why the D peak intensity is not reduced after hydrogen annealing. First, the D peak in flame-synthesized graphene is mainly due to the submicron domain size (Memon, et al. (2011) Carbon 49(15):5064-5070). Since the $I_D/I_G$ ratio is inversely proportional to the domain size of graphene (Cancado, et al. (2011) Nano Lett., 11(8):3190-3196; Lucchese, et al. (2010) Carbon 48(5):1592-1597), the ratio should stay the same if the domain size is unchanged. Second, the "self-healing" effect is offset by the hydrogen etching effect. Based on the Raman spectra, the inference may be drawn that by using hydrogen annealing, the adlayer graphene can be effectively etched away without introducing new defects or reducing domain size in flame-synthesized graphene.

Typical Raman spectra of flame-synthesized MLG features a D peak located at 1346 $cm^{-1}$, a G peak at 1585 $cm^{-1}$, and a 2D peak centered at 2695 $cm^{-1}$ (see FIG. 3). All peaks can be fitted by a Lorentzian profile. The symmetric 2D peak has a narrow full width at half maximum (FWHM) of ~35 $cm^{-1}$. For high-quality MLG synthesized in CVD, the $I_G/I_{2D}$ ratio is reported in the range from ~-0.4 to ~0.5, and the FWHM of the 2D peak is between 30 and 40 $cm^{-1}$ (Li, et al. (2011) J. Am. Chem. Soc., 133(9):2816-2819; Hu, et al. (2012) Carbon 50(1):57-65). The presence of a defect-induced D peak indicates the existence of subdomain boundaries and multi-layer graphene formation (Reina, et al. (2009) Nano Lett., 9(1):30-35; Hu, et al. (2012) Carbon 50(1):57-65). The $I_D/I_G$ ratio is usually lower than 0.05 for CVD-synthesized graphene. However, the $I_D/I_G$ ratio of large-area FLG has been reported to be between 0.05 and 0.3 (Memon, et al. (2011) Carbon 49(15):5064-5070). Here, the flame-synthesized graphene exhibits a $I_D/I_G$ ratio of 0.4. From the enlarged TEM image, the hexagonal arrangement of carbon atoms in graphene can be observed (FIG. 4). The selected area electron diffraction (SAED) pattern indicates that the MLG is not a perfect single crystal and probably has adlayers. The TEM images at different resolutions show a polycrystalline graphene film with clear grain boundaries (FIG. 4). Considering both the Raman spectra and TEM results, the MLG sample possesses additional layers, sub-micron domains, and other types of defects like vacancies and nanopores. AFM image of MLG on $Si/SiO_2$ confirms the uniformity of the film at the micrometer scale. The highlighted spots in the image are the residues stuck in the film during the wet-chemistry transfer process. A depth-profile scanning has been performed at different edges, but there is no conclusive result for the film thickness. The theoretic thickness of MLG is ~0.34 nm, but the surface roughness of $Si/SiO_2$ is measured to be ~1 nm, which creates significant variance in the thickness measurement.

Single-crystal MLG displays remarkable electro mobility at room temperature. However, the absence of a bandgap in perfect MLG prevents it from semiconductor applications. A tunable bandgap has been observed in BLG, and the gap can be tuned by an external electrostatic potential (Castro, et al. (2007) Phys. Rev. Lett., 99(21):216802; Zhang, et al. (2009) Nature 459(7248):820-823; Ohta, et al. (2006) Science 313(5789):951-954; McCann, et al. (2006) Phys. Rev. Lett., 96(8): 086805). Graphene defects such as vacancies and heteroatoms can open up a bandgap in MLG (Guo et al. (2011) Insciences J., 1(2):80-89; Cretu, et al. (2010) Phys. Rev. Lett., 105(19):196102; Yuan, et al. (2014) Materials Today, 17(2):77-85). Flame-synthesized MLG naturally exhibits a higher defective level, implying the existence of a small-percentage of BLG, vacancies, nano-scaled pores, and submicron domains. These imperfections induce a bandgap in flame-synthesized MLG for various applications.

A hydrogen etching effect on flame-synthesized graphene was discovered during a post-graphene-growth hydrogen annealing process. With this process, high-quality (meaning minimal defects) bilayer graphene can be tailored towards monolayer graphene (MLG). Such technique enables the synthesis of MLG using open-atmosphere flame synthesis for the first time. The production of MLG at atmospheric pressure is considered a challenge because the "self-limiting" mechanism of Cu no longer holds at elevated pressure. Even though MLG has been achieved in atmospheric-pressure (but confined) CVD by carefully controlling the partial pressure and flow rate of the precursor, it is still very challenging to grow MLG using any gas-phase CVD synthesis method in an open unconfined environment. Hydrogen atoms are found to be effective etching agents for weak carbon bonds and dangling bonds in adlayers of graphene. Such etching process does not damage the fine crystals of graphene, and no obvious shrinkage in graphene domain size is observed based on Raman spectra. Unlike CVD processes, this method is unconfined and more suitable for the continuous large-scale production of MLG over large surfaces at reduced costs.

Example 3

Graphene's defects can be categorized based on the scale. Atomic-scale defects include vacancy-type defects (reconstructed point defects), hetero-atoms and Stone-Wales defects. The vacancy-type defects can be created by electron irradiation in graphene, where foreign species can be trapped (Cretu et al. (2010) Phys. Rev. Lett., 105(19):196102). By purposefully introducing such defects, it is possible to open up a bandgap in graphene for semiconductors. Submicron-scale defects in graphene such as pores and grain boundaries afford many potential applications in membranes and sensors.

Nanoporous graphene (NPG) has been extensively studied in recent years. Through the formation of nano-scale pores in a large area graphene sheet, it is possible to open an energy band gap for application in field effect transistors (FETs) (Yuan, et al. (2014) Materials Today 17(2):77-85). Creating pores within graphene can also increase the amount of edges that act as adsorbing sites for gas molecules sensing. Moreover, NPG can be fabricated to be effective separation membranes for ion selection and water desalination (Surwade, et al. (2015) Nat. Nano, 10(5):459-464). Various methods have been employed to create nano-scale pores in graphene films, including focused electron beam irradiation, nanoimprint lithography, photocatalytic oxidation, and catalytic hydrogenation (Yuan, et al. (2014) Materials Today 17(2):77-85). For the fabrication of ion-selective graphene membranes, pristine graphene can be exposed to ion bombardment and oxidative etching. The pore size can then be tuned by controlling the exposure time. Raman spectra are used to measure the defects. The $I_D/I_G$ ratio can conveniently indicate the defective level in the graphene film. However, Raman spectra cannot provide comprehensive information about what types of defects exist. Further TEM analysis is then needed. For a graphene sample with $I_D/I_G$ ratio ~1, the pore density is on the order of 1 pore/100 nm$^2$.

In general, the current technique for creating defects (e.g., vacancies, pores) in graphene is by damaging CVD-grown graphene films using electron or ion beam, which requires an additional setup for graphene modification after synthesis. A direct synthesis method for defective graphene would be favorable for many applications. Herein, the etching effect of hydrogen annealing was demonstrated, being able to tailor the number of graphene layers down to 2 or 1. The influence of hydrogen annealing on graphene samples with different original conditions and substrate materials were studied using the modified multi-element inverse-diffusion flame setup. A direct synthesis method to produce highly-defective graphene was demonstrated. Furthermore, properties of as-synthesized highly-defective graphene were investigated.

Experiment

Hydrogen annealing was examined on substrates including commercial Ni and Cu foils (Alfa Aesar), ultrasmooth Cu provided by Army Research Laboratory, and Si/SiO$_2$ wafer (University Wafer). Ultrasmooth Cu substrate is electropolished on the desired area with the rest of the Cu surface roughness similar to commercial Cu (Griep et al. (2016) Nano Lett., 16(3):1657-1662). Such electropolishing process can reduce the Cu (Alfa Aesar, 25 µm, 99.8%) surface roughness by over 90%. An enhancement in graphene mechanical properties has been observed by using ultrasmooth Cu as a substrate in CVD (Griep et al. (2016) Nano Lett., 16(3):1657-1662). Graphene films were synthesized on metal substrates using the modified m-IDF setup, but graphene samples on Si/SiO$_2$ wafers were prepared by two other approaches. One was using pulse-laser deposition (PLD) to put graphene on Si/SiO$_2$. The PLD system uses a Nd-YAG Q-switched laser (532 nm and 266 nm) as the energy source and pyrolytic graphite as a target to deposit FLG on Si/SiO$_2$ at 900° C. in a high vacuum chamber (10$^{-6}$ torr). Another approach was transferring flame-synthesized graphene from Cu to Si/SiO$_2$ using the wet-chemistry method. Hydrogen annealing temperature was maintained at 1000° C. for all cases.

Raman spectroscopy (Renishaw 1000, 514 nm laser wavelength, 50×magnitude) was employed as the main tool to characterize the quality change of graphene before and after hydrogen annealing. The $I_G/I_{2D}$ ratio was used to identify the change in the number of layers of graphene. The $I_D/I_G$ ratio gives a qualitative indication of graphene domain size and number of defects. Room temperature Scanning/Transmission Electron Microscope (FEI Talos F200X S/TEM, 200 kV) was used to investigate the morphology of the nanoscale defects within defective graphene films. UV-Vis Spectroscopy measurements and band gap analysis were also conducted. To analyze the band gap energy (BGE) of the defective graphene, the samples supported on a given substrate were loaded into an Evolution 300 UVVis Spectrometer (ThermoFisher) equipped with a Praying Mantis Diffuse Reflectance Accessory (Harrick Scientific) to measure the absolute diffuse reflectance ($R_\infty$), with a Spectralon® disk as a reference. The sample beam is diffusely reflected off the sample, and the beam size is roughly 1 mm$^2$. The absolute reflectance measured in the range from 190 nm to 1100 nm is converted to Kubleka Munk units, $F(R_\infty)=KMU=(1-R_\infty)^2/2R_\infty$, which is analogous to absorbance for diffusely reflected samples. After measuring diffuse reflectance, the BGE of the samples was calculated through derivative peak fitting (DPR). Fityk software (Wojdyr, M. (2010) J. Appl. Cryst., J. Appl. Crystallogr., 43(5):1126-1128) was used to analyze the first derivatives of the absolute reflectance with respect to wavelength. Each differential diffuse reflectance function was fit with Gaussian peaks, where each peak represents an independent BGE. The centers of each peak present in the differential plot correspond to potential band gap energies of the sample.

To assess the applicability of high-defective graphene for use as filters, highly defective graphene samples were fabricated into membranes for ion selection property measurements. After hydrogen annealing, flame-synthesized graphene was transferred to a pinhole substrate and suspended on the hole using the wet-chemistry method. Pinhole substrates used here were standard precision 5-μm round apertures purchased from National Aperture. The permeability and conductance of defective graphene membranes were measured. For the conductance measurements, an electrochemical workstation using two Ag/AgCl electrodes (0.8 in diameter and 8 mm in length) and potassium chloride aqueous solution (1 Mole/L KCl) was employed. Defective graphene membranes were attached to plastic holders with an inner diameter of 5 mm and sealed with non-reactive epoxy for experimentation. The methodology used in the measurements was to apply voltages and record the corresponding current values using a 3 electrode configuration (WE, CE and RE). The conductance of the tested membrane was calculated based on the I-V curve.

Results

In order to understand the mechanism of hydrogen annealing, graphene samples on different substrate materials were first investigated. The etching effect of hydrogen annealing makes it possible to create defects in graphene film directly and tailor properties. Thus, hydrogen annealing conditions are varied to induce graphene defects. The structure and property of the as-grown defective graphene were characterized. Lastly, the potential applications of highly-defective graphene were explored.

Effect of Hydrogen Annealing on Graphene with Different Substrates

How hydrogen annealing affects the quality of graphene prepared on different substrates was investigated. Flame synthesis of few-layer graphene (FLG) on nickel substrate was produced at a wide range of temperature from 850° C. to 1000° C. A typical Raman spectrum of FLG grown on 25 μm thick Ni foil is shown in FIG. 5. Unlike graphene grown on Cu, graphene quality on Ni is not affected much by the $J_{CH4}:J_{H2}$ ratio or temperature. Graphene growth on Ni is subject to a segregation mechanism because of the higher carbon solubility in Ni than in Cu. After post-growth hydrogen annealing, flame-synthesized FLG was fully etched away on Ni. One explanation is similar to hydrogen annealing on Cu such that hydrogen can etch away weak carbon bonds at edges and growth fronts. If that is the case, Ni should have a better catalytic performance assisting hydrogen etching than does Cu because the general defective level of graphene is lower on Ni. Another possibility is the carbon dissolution-precipitation mechanism where carbon atoms dissolve back into Ni, with precipitation of nickel carbides (NiC) occurring simultaneously (Leong, et al. (2014) Nano Lett., 14(7):3840-3847). The dissolution of carbon requires imperfection sites like defects and dangling bonds in graphene (Leong, et al. (2014) Nano Lett., 14(7):3840-3847). Here, the result can be a combination of both effects, explaining why a controllable improvement in the number of graphene layers has not been observed on Ni substrates after hydrogen annealing.

Typical Raman spectrum of PLD-grown FLG exhibits a large $I_D/I_G$ ratio and low $I_G/I_{2D}$ ratio (FIG. 5). The presence of the 2D peak indicates the existence of graphene or graphitic structure. However, such spectrum also suggests the film consists of amorphous carbon and small domain graphene with defects because of the large $I_D/I_G$ ratio and slight merging of D and G peaks. After hydrogen annealing, this highly defective FLG is etched away with no carbon signals detected by Raman spectroscopy. It has been demonstrated that at high temperature, hydrogen can react with carbon dangling bonds and effectively etch away adlayers of graphene without noticeable damage to the film. The removal of PLD-grown graphene on Si/SiO$_2$ reveals that hydrogen etching is not only effective on adlayers but also dangling bonds at edges and defects. If the defects of the graphene film reach to a certain level, then hydrogen annealing can affect the film by inducing even more defects.

To verify that the wipeout phenomenon is not due to the use of a nonmetal substrate, typical flame-synthesized BLG ($I_D/I_G/I_{2D}$~0.4:1:1) films were transferred from Cu to Si/SiO$_2$ for subsequent hydrogen annealing experiments. Interestingly, the BLG film was retained without clear improvement or reduction in quality after hydrogen annealing. No observational change in $I_G/I_{2D}$ ratio indicates that the hydrogen annealing converting BLG to MLG on Cu reported above is likely a metal-substrate-assisted process (Yao, et al., (2012) Carbon 50(14):5203-5209). The BLG film is not observed with any noticeable damage after annealing, meaning that such flame-synthesized graphene does not contain considerable amounts of defect sites like PLD-grown graphene does to initiate the wipeout process. Therefore, hydrogen annealing improves graphene quality on Cu, by etching away adlayers through a metal-assisted mechanism, but it can also wipe out graphene films that contain vast amounts of defects.

Direct Synthesis of Highly Defective Graphene

The strong etching effect of hydrogen annealing on low-quality graphene (high $I_D/I_G$ ratio) indicates that direct synthesis of highly-defective graphene with tunable defects may be synthesized by controlling the raw (starting) graphene quality and annealing conditions. To examine this potential, graphene with high $I_D/I_G$ ratio (>0.4) was first intentionally synthesized with the m-IDFs burner. Here, methods for creating more defects in graphene, which holds great potential for many applications, such as gas separation and water desalination, via a controllable flame method are provided.

For a typical graphene sample (mono-, bi- or few-layer) synthesized in the flame system, the $I_D/I_G$ ratio is ~0.4 (Memon, et al. (2011) Carbon 49(15):5064-5070). Hydrogen annealing does not observably damage flame-synthesized graphene with an $I_D/I_G$ ratio of ~0.4. The reason is that the D peak in flame-synthesized graphene is mainly caused by submicron domain boundaries, not structural defects like vacancies. The formation of the grain boundary is due to the termination of graphene growth when two neighboring grains meet. Compared with conventional CVD processes, flame synthesis utilizes much higher flow fluxes so that the flames can be stabilized, which results in more prolific nucleation of carbon atoms, with a higher density of nucleation sites, on the substrate surface. Graphene grown from domains with different orientations normally do not merge to a single larger crystal, instead generating a polycrystalline film. The $I_D/I_G$ ratio of flame-synthesized graphene indicates the small grain size where the grain boundaries create defective sites. The adlayers of graphene at growth fronts contains more edges and dangling bonds that can be effectively etched away in hydrogen annealing, which, viewed in another way, enables the tailoring of the number of graphene layers.

Two parameters can significantly increase $I_D/I_G$ ratio in graphene: substrate temperature and materials. By lowering substrate temperature, the number of disorder increases in graphene crystals, and amorphous carbon growth occurs. Of course, amorphous carbon is not desired in this work since graphene structure needs to be maintained for many applications. By switching substrate from ultrapure Cu (99.9999%) to Cu (99.8%), the $I_D/I_G$ ratio increase from ~0.4 to ~0.6, which means the impurity of Cu can increase the disorder in graphene grown from scratch. For this reason, high-purity Cu is generally favored for growing high-quality graphene in conventional CVD (Murdock, et al. (2013) ACS Nano, 7(2):1351-1359). Defective graphene films ($I_D/I_G$ ratio ~ 0.6) were synthesized purposefully using Cu (99.8%) in the modified IDF burner, and then a post-growth hydrogen annealing was performed in-situ at 1000° C. in the same experiment using the same setup. All graphene samples were grown at 1000° C. with a $J_{CH4}/J_{H2}$ of 1:100 for 5 minutes. Typical Raman spectra of the defective graphene after treating with hydrogen annealing are shown in FIG. 6. Interestingly, after a 5-minute treatment, the $I_D/I_G$ ratio increases significantly from ~0.6 to ~1. The ratio is 1.2 after 10-minute annealing. However, if the annealing time is extended to 12-15 minutes, the $I_D/I_G$ ratio slightly decreases in some cases. Ratios over 1.2 were not observed for any cases studied. The rising of $I_D/I_G$ ratio confirms that more defects can be induced in graphene through hydrogen annealing, especially when the starting film is already quite defective. One thing to notice is that the $I_G/I_{2D}$ ratio is very steady with respect to annealing time. The $I_G/I_{2D}$ ratio is an indicator of the number of layers within graphene. However, in NPG, the Raman spectra of a suspended MLG can dramatically change after different exposure time to oxygen plasma. The number of layers does not change in the suspended MLG, but the chemical structure can change significantly after the plasma damage. The shape, wavenumber, and intensity of the graphene 2D band are strongly impacted by not only the number of graphene layers but also the perfection of the graphitic chemical structure. The vacancy, divacancy, or even nanoscale pores can create many kinds of structural defects and disorders in graphene. A high-resolution TEM image shows the chemical structure of flame-synthesized defective graphene (FIG. 7). Many kinds of graphene structural defects like vacancy, double vacancy, and Stone-Wales defect can be clearly observed by comparing the enlarged TEM image of defective graphene and pristine flame-synthesized MLG at the same magnitude (FIG. 7). The exact defect types exhibited in as-synthesized defective graphene is difficult to be identified clearly because of the limitation in the image resolution; nevertheless, an abundant variety of defects exist. However, such subnanometer defects, in general, afford some unique properties that have great potential in a wide range of applications. The Raman spectra provide a qualitative assessment of the density and size of graphene defects. The steady $I_G/I_{2D}$ ratio with growth time indicates that the carbon graphitic structure is retained in general during hydrogen annealing. Thus, by utilizing the hydrogen annealing treatment, the annealing condition can be used to tune the defects in flame-synthesized graphene films. Unlike the other approaches, such as ion irradiation and oxygen plasma bombardment, this approach offers a direct way to produce highly defective graphene with tunable defects.

Besides the direct observation of graphene defects, the properties of as-grown defective graphene were investigated. UV-Visible Spectroscopy was used to determine the band gap structure of graphene in the presence of defects. Band gaps in defective graphene samples are of interest because of the absence of a bandgap in perfect MLG, which cannot provide the on-off switching needed in transistor applications. Nonzero bandgap can be created and tuned in BLG by applying an electric field or uniaxial strain (Castro, et al. (2007) Phys. Rev. Lett., 99(21):216802; Zhang, et al. (2009) Nature 459(7248):820-823; Ohta, et al. (2006) Science 313(5789):951-954; McCann, et al. (2006) Phys. Rev. Lett., 96(8): 086805; Gao, et al. (2011) J. Phys. Chem. C, 115(8):3236-3242). Doping is another promising way to open and engineer the bandgap in graphene. Either substitutional doping of nitrogen and boron atoms in graphene structure or adsorption of groups and molecules (e.g., $H_2SO_4$, $N_2O_4$, AuPt, $Au_3Pt_3$, etc.) can open the band gap of graphene (Akturk, et al., (2010) Appl. Phys. Lett. 96:081914; Gao, et al. (2011) J. Phys. Chem. C, 115(8): 3236-3242). Highly-defective graphene can be another avenue to give band gap properties.

Firstly, UV-Visible spectroscopy was performed on as-synthesized defective graphene still attached to its Cu substrate. The band gap energies were measured via the Diffuse Reflectance Derivative Peak Fitting (DPR) method, where the center of each Gaussian peak fit to the first derivative, $dR_\infty/d\lambda$, spectra corresponds to a band gap. Prior to band gap analysis, the background signal from the Cu substrate is subtracted from the absolute reflectance of the sample. The band energies of defective graphene in the low-energy range (800 nm to 1000 nm) are shown in FIG. 8. In the mid-energy range, Cu exhibits a strong plasmonic resonance around 580 nm. Four individual band energies are determined after Gaussian peak fitting (Table 2). The overall band gap observed is ~1.4 eV, which is higher than that of NPG (<1 eV) made by other approaches. It is noted that with increasing defects, the area of the Gaussian peaks in the low-energy BGE region increases indicating that by creating more defects, band gaps can be opened in graphene. The concentration of these gaps seems to be correlated to the number of defects in the graphene.

TABLE 2

Band energies of defective graphene with different $I_D/I_G$ ratio.

| Case | Band A | Band B | Band C | Band D |
|---|---|---|---|---|
| 0 min ($I_D/I_G$~0.6) | 1.46 eV | 1.39 eV | 1.32 eV | 1.28 eV |
| 5 min ($I_D/I_G$~1.0) | 1.42 eV | 1.35 eV | 1.30 eV | 1.27 eV |
| 10 min ($I_D/I_G$~1.2) | 1.4 eV | 1.34 eV | 1.30 eV | 1.27 eV |

In order to get better isolated diffuse reflectance spectra, as-grown defective graphene samples were transferred from Cu substrate to quartz or fused silica substrates, thus eliminating the strong signal at ~580 nm due to the plasmonic resonance of Cu. Analysis of the Kubelka Munk of these samples (FIG. 9) shows that the maximum absorption at ~270 nm (4.6 eV), which corresponds to the π-π* transition of the aromatic C=C bond in graphene (Su, et al. (2014) J. Phys. Chem. C, 118(23):12520-12525; Chang, et al. (2013) ACS Nano 7(2):1333-1341). The shift in the peak position has been previously determined to correspond to the area of the aromatic system (Su, et al. (2014) J. Phys. Chem. C, 118(23):12520-12525; Tolle, et al. (2012) Adv. Funct. Mater., 22(6):1136-1144). The result indicates that the redshift of the maxima could be used to monitor the increasing amount of defects in the sample.

An exception is observed on ultrasmooth Cu (99.8%). By performing the same flame synthesis process, graphene grown on ultrasmooth Cu surface exhibits a remarkably large D peak with an $I_D/I_G$ ratio~1.2, which was never observed on commercial Cu (99.8%) substrates (FIG. 10). The electropolished surface may contain residuals from electrolytes, which induces more defects in graphene growth. Another possibility is that the nucleation density of graphene is higher on a smoother surface. After hydrogen annealing for 10 minutes, the $I_D/I_G$ ratio is reduced to ~1, and $I_G/I_{2D}$ rate is slightly increased. At some locations, $I_G/I_{2D}$ rate can be smaller than 0.7, indicating MLG. Therefore, hydrogen annealing cures some defects and reduces the number of layers in this highly defective graphene originally grown on ultrasmooth Cu.

The outcome of hydrogen annealing is a combination of several effects, including the interaction between hydrogen and carbon dangling bonds, the catalytic mechanism of the substrate, and the rearrangement of carbon atoms at high temperature. Based on these studies, such outcome is highly depending on the original graphene chemical structure and substrate materials. Both MLG and highly defective graphene can be achieved by utilizing this treatment.

One of the main potential applications of highly-defective graphene is ultrafiltration, such as ion selection, gas separation, water desalination, and even DNA sequencing. Porous graphene membranes exhibit orders of magnitude higher flow rates than commercial reverse osmosis membranes, as well as have excellent salt rejection properties (Rollings, et al. (2016) Nat. Commun., 7:ncomms11408). To study the ion rejection property of flame-synthesized defective graphene, a conductance measurement was performed. As-grown defective graphene films are transferred to round pinholes with 5 μm aperture. In the measurements, conductance comes from three parts: a) the open area; b) the access resistance (effective for very thin pores/membranes like graphene); and c) surface charge. The general formulation taking into account the contribution of the surface charge ($\Sigma$) is:

$$G = \kappa_b \left[ \frac{4L}{\pi d^2} \times \frac{1}{1 + 4\frac{l_{du}}{d}} + \frac{2}{\alpha d + \beta l_{du}} \right]^{-1}$$

where $\kappa_b$ is the bulk conductivity, L is the pore length, d is the pore diameter; $l_{du}$ is the Dukhin length (which can be approximated by $(|\Sigma|/e)/2c_s$, where e is the elementary charge and $c_s$ is the salt concentration); $\alpha$ is a geometrical prefactor that depends on the model used; and $\beta$ can be approximated to be 2 to obtain the best fitting agreement (Feng, et al. (2016) Nature 536:197-200). To eliminate the surface charge effect, the molarity of the KCl solution is increased to 1 Mole/L, for the graphene membranes tests. In this case, the formulation becomes:

$$G = \kappa_b \left( \frac{4L}{\pi d^2} + \frac{1}{d} \right)^{-1}$$

for the estimation of the pore size based on the measured conductance of the membrane (Rollings, et al. (2016) Nat. Commun., 7:ncomms11408). Here, the first term is the bulk conductance, and the second term is the access resistance. From the I-V curve slope, the conductance can be obtained; and from the conductance, the effective open-area diameter, d, can be estimated for a known membrane thickness value. In the estimation, the thickness of 1 nm for graphene is used. For the control template, 14.7 microns (thickness of the 5-μm pinhole) is used. Only the effective diameter of the total open area can be estimated since the value of individual pore diameters and density of defects are unknown. The conductance results of the control sample (bare 5-μm pinhole) and defective graphene membranes with different ID/G ratio are listed in Table 3. The estimated effective diameter of the control sample calculated using the formula above is 4.93 μm, whose error is around 1%. Since the testing area is the same (i.e., 5 μm) for all the samples, the estimated open-area percentage is calculated by $(d/d_c)^2$, where $d_c$ is the effective diameter of the control sample. For the case of $I_D/I_G$~ 0.6, the estimated open-area percentage is 0.000023%, which implies the membrane is nearly impermeable to the ions. As the $I_{D/G}$ ratio increases, the estimated open-area percentage also increases. For the most defective case $I_D/I_G$~1.2, the estimated open-area percentage is 0.8%. If the pore diameter is known and the pore sizes are uniform, the pore number can be estimated by this approach.

TABLE 3

Results of conductance measurements and estimated open-area diameter and percentage respect to different $I_D/I_G$ ratios.

| Case | Conductance G (S) | Effective diameter | Open-area percentage |
|---|---|---|---|
| Control | 1.21E−05 | 4.93 μm | 100% |
| $I_D/I_G$~1.2 | 4.53E−06 | 0.44 μm | 0.8% |
| $I_D/I_G$~1.0 | 1.57E−06 | 0.15 μm | 0.09% |
| $I_D/I_G$~0.6 | 1.62E−08 | 0.0024 μm | 2.3E−5% |

The nitrogen permeability has been measured for all of the defective graphene membranes. However, nearly no nitrogen flow is observed in any sample. Many reports in the literature suggest that nitrogen is nearly impermeable in nanoporous graphene (NPG) because of the surface adsorption (Du, et al. (2011) J. Phys. Chem. C, 115(47):23261-23266; Kim, et al. (2013) Science 342(6154):91-95; Sun, et al., (2014) Langmuir 30(2):675-682). The nitrogen impermeability of flame-synthesized defective graphene implies the size of defects is mainly sub-nanometer. Such property affords a wide range of applications in gas separation. Based on current results, flame synthesis can synthesize directly graphene with tunable defects (number and size), affording a wide range of ion selection and gas separation membrane applications.

Post-growth hydrogen annealing was performed on graphene samples with different original conditions and substrate materials, such as ultrapure Cu, Cu, Ni, Si and ultrasmooth Cu. The etching effect of hydrogen annealing is predominantly a metal-assisted process because graphene transferred to Si substrate stays unchanged before and after annealing treatment. However, the etching effect can be very strong on graphene sample containing lots of defects, regardless the substrate material. Based on current results, the initial $I_D/I_G$ ratio found in this work is ~0.6. The $I_D/I_G$ ratio increases dramatically after hydrogen annealing when as-synthesized graphene on Cu exhibits an initial ratio of at least 0.6. However, the $I_D/I_G$ ratio does not change obviously after annealing if the initial ratio is lower than 0.6. Inspired by such phenomenon, "low-quality" graphene was intentionally produced on low-purity Cu substrate, and then highly defective graphene films with tunable defective level are achieved by employing hydrogen annealing treatments. Current methods mainly use ion irradiation or plasma to damage CVD-synthesized graphene in order to create nanoscale or subnanoscale defects. However, such methods requiring expensive setups, and multiple steps may not be economically viable for large-scale production. The well-controlled flame method offers a readily available route to synthesize directly highly-defective graphene scalably, economically, and rapidly. By controlling the number of defects, a direct band gap can be opened up in flame-synthesized graphene. The band gap energy (BGE) was analyzed by UV-Vis spectroscopy. The chemical structure of as-synthesized highly defective graphene was studied using high-resolution TEM. Various types of defect including point defect, divacancy, and Stone-Wales defect were observed. Such subnanometer defect sites contribute to the direct BGE, affording many applications. The filtration property of the highly-defective graphene as a membrane was investigated, showing potential in ion selection and gas separation.

Example 4

The exceptional physical and chemical properties of graphene afford a wide range of applications from next-generation electronics to novel biomedical devices. To enable the practical applications of graphene, an affordable manufacturing method suitable for largescale production is sought.

Flame synthesis has demonstrated its viability in growing few-layer graphene (FLG) using a dual flame setup or a multiple inverse-diffusion flame burner. However, the growth of mono- and bilayer graphene using an open-atmosphere flame process remains challenging because of the breakdown of self-limiting growth on copper as pressure is raised to atmospheric pressure. The synthesis configuration employed herein is based on a modified multi-element inverse-diffusion flame (m-IDF) setup. The pyrolysis vapors and post-flame species are directed at a substrate to grow graphene. Each of the tiny individual flames operates in the inverse mode ("under-ventilated), where for each flame, the oxidizer (e.g., oxygen diluted with inert) is in the center and fuel (e.g., hydrogen diluted with inert) surrounds it. Far downstream, multiple diffusion flames create a one-dimensional post-flame profile with radially uniform profiles of temperature and chemical species. Such one-dimensional flame in net effect is suitable for the fundamental study of graphene growth in flame. The precursor tubes inject precursor gases (e.g., methane, ethylene) downstream of the flame. This design ensures that hydrocarbon precursor does not pass through or near the multiple flames, avoiding oxidation and dissociation of hydrocarbon species. Since carbon formation process and fuel oxidation process are effectively separated, no soot is observed in the modified m-IDF setup for all experimental conditions. Modified m-IDF has no scaling problem since all flow velocity can be independent of the burner diameter. Such technique affords large-area deposition of nanostructured carbon in open-atmosphere by shielding the setup with an inert co-flow or encompassing tube preventing diffusion from the ambient.

Experiment

Copper (Cu) and nickel (Ni) foils from Alfa Aesar were used as substrates for graphene growth. The metal foils were placed downstream of the m-IDFs in the post-flame gases at a certain distance (8-12 mm). Prior to graphene growth, the copper substrate was first reduced by running the m-IDFs with only hydrogen as fuel, such that the downstream gases are rich in hydrogen at ~1000° C., for 10 minutes to remove any oxide layer and to enlarge the grain size on the metal foils. No hydrocarbon species was introduced into the system during this period. To initiate graphene growth, methane, as a precursor, is then introduced into the post-flame region through the precursor tubes directed at the substrate. Bi- and few-layer graphene are grown on copper and nickel substrates for different methane-to-hydrogen flow rate ratios ($J_{CH4}$:$J_{H2}$), growth temperatures, and durations. An S-type thermocouple (125 μm Pt/Pt-10% Rh) coated with silica is utilized to measure the substrate temperature, which ranges from 800° C. to 1000° C. When the precursor injection period was done, the m-IDFs were extinguished by shutting off the oxygen supply. Hydrogen and inert gases continued to flow until the substrate was cooled to room temperature. As-synthesized graphene can be transferred onto Si/SiO$_2$ substrates from a Cu substrate by following these steps: i) spin-coat one side of the graphene/Cu/graphene sample with 300 nm-thick polymethyl-methacrylate (PMMA) film and heat in furnace at 150° C. for 5 minutes to cure the PMMA protection film; ii) immerse PMMA/graphene/Cu/graphene stack in 10% HNO$_3$ solution for 2 minutes to remove graphene on the unprotected side and rinse in DI-water for multiple times; iii) float PMMA/graphene/Cu foil in 1 mole/L FeCl$_3$ solution to etch away all copper substrate; iv) rinse the PMMA/graphene film in DI-water for multiple times and then transfer it onto Si/SiO$_2$; v) remove PMMA layer by rinsing in hot acetone and dry at room temperature overnight. Micro-Raman spectroscopy (Renishaw 1000, 514 nm laser wavelength, 50×magnitude) is utilized to characterize the quality of graphene on Cu and Si/SiO$_2$ substrates, post experiment.

Results

Flame synthesis of FLG has been demonstrated on different transition metals, but monolayer graphene (MLG) and bilayer graphene (BLG) have not been achieved using any open-atmosphere flame process. Although the thermodynamics of graphene grown on a Cu catalyst surface should be the same for both atmospheric- and low-pressure chemical vapor deposition (CVD) processes, the appearance of bi- and few-layer graphene in atmospheric-pressure CVD process reveals that the kinetics (cooling rate, synthesis pressure, methane concentration) impact significantly the thickness uniformity and quality of graphene growth (Bhaviripudi, et al. (2010) Nano Lett., 10(10):4128-4133). Therefore, herein, a parametric study was performed to optimize flame conditions for graphene growth. Raman spectroscopy enables ex-situ characterization of the quality of graphene, including the number of layers and defective level (Malard, et al. (2009) Phys. Rep., 473(5-6):51-87). For 514 nm laser excitation, the typical Raman spectra of graphene have three prominent peaks, the D peak at ~1350 cm$^{-1}$, which corresponds to the disorders present in graphene layer, the G peak at ~1580 cm$^{-1}$, and the 2D peak at ~2700 cm$^{-1}$. The intensity ratio of G-peak-to-2D-peak ($I_G$/$I_{2D}$) can be used as a qualitative indicator to estimate the number of graphene layers. For monolayer graphene, the $I_G$/$I_{2D}$ ratio is usually around or above 2. The ratios are around 1 and smaller than 1 for bi- and few-layer graphene respectively.

The formation of amorphous carbon films on Cu has been reported in the temperature range between 500° C. and 750° C. using multiple inverse-diffusion flames (Memon, et al. (2013) Proc. Combustion Inst., 34(2):2163-2170). The 2D peak of graphene, which indicates the presence of graphitic carbon structure, starts to appear on Cu at the temperature of 700° C. (Memon, et al., Carbon 49(15):5064-5070). Typical Raman spectra of graphitic carbon structures grown on Cu at low-temperature range from 700° C. to 850° C. The high $I_G$/$I_{2D}$ ratio and the merging of D and G bands imply the growth of amorphous carbon and nanocrystalline graphite at low-temperature (Ferrari, et al. (2000) Phys. Rev. B, 61(20): 14095-14107).

The effective synthesis of few-layer graphene (FLG) is observed at increasing temperatures starting at 850° C.

Raman spectra of graphene grown at different temperatures for a fixed growth duration and $J_{CH4}:J_{H2}$ rate are shown in FIG. 11. By increasing synthesis temperatures from 850° C. to 1000° C., a significant decrease in $I_G/I_{2D}$ ratio is observed from 2 to 1.2, which indicates the number of graphene layers decreases as temperature increases. Graphene with $I_G/I_{2D}$ ratio of 1.3 has been reported as a tri-layer film (Reina, et al. (2009) Nano Lett., 9(1):30-35), and 5 to 10 layers of graphene has an $I_G/I_{2D}$ ratio from 1.8 to 2.4 (Robertson et al. (2011) Nano Lett., 11(3):1182-1189). A lower intensity of D peak indicates less disorder within the film. This result agrees with the consensus of CVD processes mostly using ~1000° C. (Li, et al. (2009) Science 324(5932):1312-1314; Li, et al. (2011) J. Am. Chem. Soc., 133(9):2816-2819; Xing, et al. (2013) Chem. Phys. Lett., 580:62-66), which is right below the melting point of copper (~1085° C.), as an optimum growth temperature.

In atmospheric-pressure CVD (APCVD), though not an open environment, monolayer graphene growth has been reported at very low $J_{CH4}:J_{H2}$ ratios (<1:1000) (Bhaviripudi, et al. (2010) Nano Lett., 10(10):4128-4133). However, the termination of FLG growth was observed when the methane-to-hydrogen flow rate ratio ($J_{CH4}:J_{H2}$) is below 1:40, using the multiple inverse-diffusion flames burner (Memon, et al. (2011) Carbon 49(15):5064-5070). In that flame synthesis experiment, $CH_4$ was delivered through the fuel tubes, along with hydrogen, of the m-IDFs burner (and not by separate precursor tubes). Thus, the effect of $J_{CH4}:J_{H2}$ ratio is coupled with the flame condition because only excess hydrocarbon species can serve as the active carbon source for graphene growth. Therefore, the concentration of active carbon species in the post-flame region cannot afford graphene growth if the $J_{CH4}:J_{H2}$ ratio is lower than a critical value. Since $J_{CH4}:J_{H2}$ ratio plays a major role in the kinetics of graphene growth, a parametric study of its effect is necessary to optimize the flame synthesis condition.

Taking advantage of the modified m-IDF setup (where extended precursor tubes are utilized), the study of graphene growth was in a wide range of $J_{CH4}:J_{H2}$ ratios because the $CH_4$ flow rate is now independent of the flame condition. When $J_{CH4}:J_{H2}$ ratio is larger than 1:20, uniform FLG is grown on Cu, which agrees with results of FLG growth at $J_{CH4}:J_{H2}$ ratios from 1:5 to 1:20 in flame synthesis (Memon, et al. (2011) Carbon 49(15):5064-5070). A wide range of $J_{CH4}:J_{H2}$ ratios from 1:25 to 1:1000 was studied at a fixed substrate temperature of 1000° C. and growth duration. Raman spectra of graphene grown on Cu with $J_{CH4}:J_{H2}$ ratio varied from 1:25 to 1:100 is shown in FIG. 12. The $I_{CH4}/I_{2D}$ ratio decreases from 1.5 to 1.1 as the $J_{CH4}:J_{H2}$ ratio drops. With decreasing methane flow rate, the density of graphene nucleation sites reduces because of the lessening of the degree of supersaturation of active carbon species on the copper surface to promote graphene nucleation. The reduction in nucleation density often leads to a higher quality growth of graphene with larger domain size and fewer imperfections. However, by further lowering methane concentration to the condition of APCVD, it only leads to a longer time needed for graphene to cover the substrate surface and MLG was not observed in any of the cases. The case of graphene growth with $J_{CH4}:J_{H2}$ ratio at 1:350 for 20 minutes is nearly identical to the case with $J_{CH4}:J_{H2}$ ratio at 1:100 for 10 minutes. The high flow flux and large numbers of combustion products (e.g., $H_2O$, OH, CO, $CO_2$) make a flame synthesis configuration different than CVD results. Such open-atmosphere flame process seems to be limited in reducing graphene nucleation sites.

Growth time is another critical parameter for the gas-phase synthesis of graphene at atmospheric pressure since the self-limiting mechanism is not valid in the case. A larger number of graphene layers is expected for longer growth time because adlayers are formed simultaneously between the first layers and the Cu surface. At a graphene nucleation site, all adlayers share the same nucleation center and have the same edge termination. In this experiment, the growth time varies from 30 seconds to 30 minutes, while growth temperature is fixed at 1000° C., and $J_{CH4}:J_{H2}$ ratio at 1:100. However, when growth time is reduced below 5 minutes, the graphene film cannot fully cover the Cu substrate (15 mm by 15 mm). Raman spectra in FIG. 13 shows the number of graphene layers decreasing significantly based on $I_G/I_{2D}$ ratio when the growth time decreases from 20 minutes to 5 minutes. For a 5-minute growth at optimal temperature (1000° C.) and $J_{CH4}:J_{H2}$ ratio (1:100), the $I_G/I_{2D}$ ratio is less than 1, which suggests the growth of BLG, being achieved for the first time in an open-atmosphere open-environment flame process. Nevertheless, no monolayer graphene growth is observed in the growth time between 30 second and 5 minutes. An explanation of this result is that a relatively high carbon flux still reaches the substrate, leading to small graphene domain size (Memon, et al. (2011) Carbon 49(15): 5064-5070), where the time scale of adlayer growth is on the order of graphene nucleation.

In the gas-phase synthesis of graphene, the growth mechanism strongly depends on substrates materials. The solubility of carbon at high temperature dominates the growth process. Graphene growth on transition metals has been demonstrated in various synthesis methods. However, metal-catalyst-free synthesis of graphene has very limited progress because of the weak adsorption of hydrocarbons on non-metals. Polycrystalline graphene on $SiO_2$ has been achieved using an oxygen-aided CVD process performed at 1100° C. for 3 to 8 hours (Chen, et al. (2011) J. Am. Chem. Soc., 133(44):17548-17551). Such technique demonstrates the possibility of directly growing graphene on $Si/SiO_2$ via CVD, but the graphene film quality is not comparable to that of conventional CVD. Moreover, this oxygen-aided CVD method is not feasible for graphene manufacturing because of the high energy consumption rate and low production rate.

A number of substrate materials have been studied in this research. Raman spectra of graphene synthesized on nickel (99% Ni, 25 μm), copper (99.8% Cu, 25 μm), and ultrapure copper (99.9999% Cu, 0.1 mm and 0.25 mm) substrates undergoing exactly the same experimental process are displayed in FIG. 14. All metal substrate materials were purchased from Alfa Aesar. Both 0.1-mm and 0.25-mm thick ultrapure copper substrates give identical results, indicating graphene growth on Cu is a surface process mostly independent of substrate thickness. BLG on ultrapure Cu has noticeably better quality with higher $I_G/I_{2D}$ ratio and lower D peak intensity. Because of the segregation mechanism, graphene grown on Ni is a uniform few-layer film with fewer defects than that grown on Cu.

Methane ($CH_4$) is the most used hydrocarbon precursor in the gas-phase synthesis of graphene because of its low pyrolysis rate (Qi, et al. (2013) J. Phys. Chem. C, 117(27): 14348-14353). However, ethylene ($C_2H_4$) and acetylene ($C_2H_2$) have also been investigated for growing graphene in CVD (Qi, et al. (2013) J. Phys. Chem. C, 117(27):14348-14353; Luo, et al. (2011) J. Mater. Chem., 21(22):8038-8044; Ramon, et al. (2011) ACS Nano, 5(9):7198-7204; Wang, et al. (2013) New J. Chem., 37(3):640-645). The effect of $C_2H_4$ and $C_2H_2$ on the flame synthesis of graphene was investigated using the modified m-IDF burner.

Ultrapure Cu was used as a substrate for $C_2H_4$ and $C_2H_2$ experiments. In both experiments, the flow rate ratio between carbon precursor and $H_2$ (C/$H_2$) was maintained at 1:50, which is equivalent to the case $J_{CH4}$:$J_{H2}$=1:100 with respect to the total amount of carbon input. Raman spectra show BLG in $C_2H_4$ and $C_2H_2$ cases for a 5-minute growth time at 1000° C. (FIG. 15). Such results are identical to a previous $CH_4$ case under the same growth condition. However, a lower growth rate has been observed in both cases. This result may be because the carbon flux is halved to maintain the same C/$H_2$ input rate as the $CH_4$ case. The D peak to G peak ratio for both cases lies in between 0.3 and 0.4, which is similar to that of the $CH_4$ case.

Flow field profile affects the diffusion of active carbon species from the post-flame gases to the substrate. Uniform graphene with grain sizes up to 10 μm has been grown on Cu foil tilted at an angle against the gaseous flow in a CVD process (Zhang, et al. (2012) J. Mater. Chem., 22(35):18283-18290). Here, substrates were placed in different orientations in order to create different flow field profiles for graphene growth. Raman spectra of graphene grown on Cu with perpendicular, tilted (45°), and parallel orientations with respect to the post-flame flow are shown in FIG. 16. The $I_G/I_{2D}$ ratios are ~1, for all three orientations at optimal growth condition. Perpendicular orientation creates a stagnation flow profile, leading to a result with slightly lower $I_G/I_{2D}$ ratio than do tilted and parallel orientations. The slight difference in graphene quality can be due to the difference in mass transport in the different boundary layer flows.

Raman spectroscopy was employed on a bilayer graphene (BLG) before and after a transfer to evaluate the transferability of flame-synthesized graphene. Raman spectra show equal $I_G/I_{2D}$ ratio after transfer, which means the graphene film was successfully transferred from the Cu to Si/SiO$_2$ substrate using the wet-chemistry process. The D peak intensity is weaker on Si/SiO$_2$ substrate than on the original Cu substrate, which implies a reduction in graphene defects induced by copper surface imperfections such as grooves and grain boundaries. The $I_D/I_G$ ratio on Si/SiO$_2$ is ~0.4, which agrees with FLG growth using flame synthesis. The G and 2D bands get sharper and narrower as the full width at half maximum decreases after transfer, which also implies that some copper surface effects are eliminated.

By employing the modified multi-element inverse-diffusion flames setup, the influence of various parameters, including substrate material, precursor, temperature, and growth time on graphene synthesis was demonstrated. Under optimized condition, the synthesis of bi-layer graphene was reported for the first time using an open-atmosphere flame synthesis method. The transition growth from few-layer graphene to bilayer was observed by varying substrate temperature and methane-to-hydrogen flow rate ratio. Graphene films are grown on different substrates. Bilayer graphene films exhibit different levels of defect on Cu substrates with different purities. The higher the Cu purity; the fewer defects or disorders are induced by the substrate. Because of a different growth mechanism, Ni substrate gives thicker graphene growth (few-layer), but with fewer defects. The effects from different precursors and flow field were examined. Moreover, an in-situ Raman spectroscopy measurement was performed on the experimental setup to understand the evolution of carbon species in the flame flow. The dominant carbon species observed near the substrate are $CH_4$, $C_3H_8$, $C_2$, and $CH_2$, which can be the main carbon species transported to the substrate promoting graphene growth. Flame-synthesized graphene can be transferred onto arbitrary substrates for applications. Therefore, such method can continuously produce bi- and few-layer graphene over large areas, for example by rasterizing, in an open-atmosphere environment. Compared with conventional CVD, flame synthesis also has advantages in processing time and cost.

A number of publications and patent documents are cited throughout the foregoing specification in order to describe the state of the art to which this invention pertains. The entire disclosure of each of these citations is incorporated by reference herein.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. An ultrafiltration membrane, wherein said ultrafiltration membrane comprises a nano-defective graphene film, wherein the nano-defective graphene film has an ID/IG ratio of 1.2 or higher, and wherein said nano-defective graphene film is a monolayer.

2. The ultrafiltration membrane of claim 1, wherein said nano-defective graphene film is selected from the group consisting of sheets, plates, and discs.

3. The ultrafiltration membrane of claim 1, wherein the nano-defective graphene film is synthesized by reacting an oxidizer and a fuel in a modified multiple, inverse-diffusion flame burner, wherein said modified multiple, inverse-diffusion flame burner comprises delivery tubes for the fuel extending beyond a main burner surface, wherein said method comprises:
a) reducing a metal substrate in said modified, multiple inverse-diffusion flame burner wherein hydrogen ($H_2$) is the only fuel;
b) adding a hydrocarbon precursor through the fuel lines extending beyond the main burner surface of the modified, multiple inverse-diffusion flame burner to synthesize the graphene on said substrate; and, optionally,
c) annealing the flame-synthesized graphene of step b) by running the modified, multiple inverse-diffusion flame burner wherein hydrogen ($H_2$) is the only fuel.

4. The ultrafiltration membrane of claim 3, wherein said method comprises annealing the flame-synthesized graphene of step b) by running the modified, multiple inverse-diffusion flame burner wherein hydrogen ($H_2$) is the only fuel.

5. The ultrafiltration membrane of claim 3, wherein said metal substrate is less than 99.9% pure.

6. The ultrafiltration membrane of claim 3, where the modified, multiple, inverse-diffusion-flame burner comprises an array of stabilized flames that form radially uniform temperature and species distribution downstream.

7. The ultrafiltration membrane of claim 3, wherein the oxidizer is air, $O_2$, or an oxidizing agent.

8. The ultrafiltration membrane of claim 3, wherein the metal substrate is copper, nickel, steel, transition metals, alloys thereof, or spinels thereof.

9. The ultrafiltration membrane of claim 3, where the fuel contains at least one additive, thereby forming doped nano-defective graphene films.

10. The ultrafiltration membrane of claim 9, wherein the additive is a nitrogen species or a boron species.

11. The ultrafiltration membrane of claim 1, wherein said nano-defective graphene film is doped with ions.

12. The ultrafiltration membrane of claim 11, wherein said nano-defective graphene film is doped with ions in vacant atomic sites.

13. The ultrafiltration membrane of claim 11, wherein said ions are metal ions.

14. A method of ultrafiltration, said method comprising passing a gas or liquid through the ultrafiltration membrane of claim 1.

15. The method of claim 14, wherein said ultrafiltration is ion selection, gas separation, water desalination, or gas molecule sensing.

16. The method of claim 14, said method further comprising synthesizing said nano-defective graphene film.

17. The ultrafiltration membrane of claim 1, wherein said nano-defective graphene film is a sheet.

18. An ultrafiltration membrane, wherein said ultrafiltration membrane comprises a nano-defective graphene film, wherein the nano-defective graphene film has an $I_D/I_G$ ratio of 1.2 or higher, wherein said nano-defective graphene film is a sheet.

19. The ultrafiltration membrane of claim 18, wherein said nano-defective graphene film is a monolayer or a few layer.

20. A method of ultrafiltration, said method comprising passing a gas or liquid through the ultrafiltration membrane of claim 18.

21. The ultrafiltration membrane of claim 18, wherein said nano-defective graphene film is a monolayer sheet.

22. A method of ultrafiltration, said method comprising passing a gas or liquid through the ultrafiltration membrane of claim 18.

23. The method of claim 22, wherein said ultrafiltration is ion selection, gas separation, water desalination, or gas molecule sensing.

24. An ultrafiltration membrane, wherein said ultrafiltration membrane consists of a nano-defective graphene film, wherein the nano-defective graphene film has an $I_D/I_G$ ratio of about 0.6 or higher, and wherein said nano-defective graphene film is a monolayer.

25. A method of ultrafiltration, said method comprising passing a gas or liquid through the ultrafiltration membrane of claim 24.

26. The method of claim 25, wherein said ultrafiltration is ion selection, gas separation, water desalination, or gas molecule sensing.

27. An ultrafiltration membrane, wherein said ultrafiltration membrane consists of a nano-defective graphene film, wherein the nano-defective graphene film has an $I_D/I_G$ ratio of about 0.6 or higher, wherein said nano-defective graphene film is a sheet.

28. A method of ultrafiltration, said method comprising passing a gas or liquid through the ultrafiltration membrane of claim 27.

29. The method of claim 28, wherein said ultrafiltration is ion selection, gas separation, water desalination, or gas molecule sensing.

30. A method of synthesizing an ultrafiltration membrane, wherein said ultrafiltration membrane comprises a nano-defective graphene film, wherein the nano-defective graphene film has an $I_D/I_G$ ratio of about 0.6 or higher, said method comprising synthesizing the nano-defective graphene film by
   a) reducing a metal substrate in said modified, multiple inverse-diffusion flame burner wherein hydrogen ($H_2$) is the only fuel, wherein said modified multiple, inverse-diffusion flame burner comprises delivery tubes for the fuel extending beyond a main burner surface;
   b) adding a hydrocarbon precursor through the fuel lines extending beyond the main burner surface of the modified, multiple inverse-diffusion flame burner to synthesize the graphene on said substrate; and
   c) annealing the flame-synthesized graphene of step b) by running the modified, multiple inverse-diffusion flame burner wherein hydrogen ($H_2$) is the only fuel.

31. A method of ultrafiltration, said method comprising passing a gas or liquid through an ultrafiltration membrane, wherein said ultrafiltration membrane comprises a nano-defective graphene film, wherein the nano-defective graphene film has an $I_D/I_G$ ratio of about 0.6 or higher, said method further comprising synthesizing said nano-defective graphene film by:
   a) reducing a metal substrate in a modified, multiple inverse-diffusion flame burner wherein hydrogen ($H_2$) is the only fuel, wherein said modified multiple, inverse-diffusion flame burner comprises delivery tubes for the fuel extending beyond a main burner surface;
   b) adding a hydrocarbon precursor through the fuel lines extending beyond the main burner surface of the modified, multiple inverse-diffusion flame burner to synthesize the graphene on said substrate; and, optionally,
   c) annealing the flame-synthesized graphene of step b) by running the modified, multiple inverse-diffusion flame burner wherein hydrogen ($H_2$) is the only fuel.

\* \* \* \* \*